US011558556B2

(12) United States Patent
Oh et al.

(10) Patent No.: US 11,558,556 B2
(45) Date of Patent: Jan. 17, 2023

(54) ELECTRONIC DEVICE FOR ACQUIRING IMAGE BY USING LIGHT-EMITTING MODULE HAVING POLARIZING FILTER AND METHOD FOR CONTROLLING SAME

(71) Applicant: SAMSUNG ELECTRONICS CO., LTD., Suwon-si (KR)

(72) Inventors: Youngjae Oh, Suwon-si (KR); Jinhong Min, Suwon-si (KR); Hyoungseon Choi, Suwon-si (KR); Joonho Kim, Suwon-si (KR); Changwon Son, Suwon-si (KR); Jiwoon Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/371,962

(22) Filed: Jul. 9, 2021

(65) Prior Publication Data
US 2022/0014665 A1 Jan. 13, 2022

(30) Foreign Application Priority Data

Jul. 9, 2020 (KR) .......... 10-2020-0084784
Jan. 8, 2021 (KR) .......... 10-2021-0002848

(51) Int. Cl.
*H04N 5/235* (2006.01)
*H04N 5/232* (2006.01)
(Continued)

(52) U.S. Cl.
CPC ......... *H04N 5/2354* (2013.01); *G06V 40/171* (2022.01); *H04N 5/2254* (2013.01); *H04N 5/232935* (2018.08)

(58) Field of Classification Search
None
See application file for complete search history.

(56) References Cited

U.S. PATENT DOCUMENTS

2003/0210336 A1* 11/2003 Khan .................. H04N 7/186
386/E5.001
2014/0347512 A1 11/2014 Sethi
(Continued)

FOREIGN PATENT DOCUMENTS

CN      107411705 A    12/2017
JP      2018-126632 A   8/2018

OTHER PUBLICATIONS

International Search Report (PCT/ISA/210) dated Oct. 18, 2021 by the International Searching Authority in International Application No. PCT/KR2021/008797.
(Continued)

*Primary Examiner* — Cynthia Segura
(74) *Attorney, Agent, or Firm* — Sughrue Mion, PLLC

(57) ABSTRACT

An electronic device includes a display; a camera; a first light emitting module, wherein each of the camera and the first light emitting module comprises a first type polarizing filter; a second light emitting module including a second type polarizing filter that is different from the first type polarizing filter; and at least one processor configured to: obtain a first image by using the camera, based on a first light output from the first light emitting module and a second light output from the second light emitting module; identify at least one feature point in the first image; and control the display to display the first image and information related to the at least one feature point.

18 Claims, 24 Drawing Sheets

(51) Int. Cl.
H04N 5/225 (2006.01)
G06V 40/16 (2022.01)

(56) References Cited

U.S. PATENT DOCUMENTS

| | | |
|---|---|---|
| 2015/0062380 A1 | 3/2015 | Nakamura et al. |
| 2016/0057325 A1 | 2/2016 | Park et al. |
| 2016/0098614 A1* | 4/2016 | Yamanashi ............ G06V 10/60 |
| | | 348/135 |
| 2016/0135730 A1* | 5/2016 | Arai ..................... A61B 5/0077 |
| | | 600/476 |
| 2019/0269363 A1 | 9/2019 | Vilenskii |
| 2021/0152749 A1* | 5/2021 | Kurita .................. H04N 5/2256 |
| 2021/0183058 A1* | 6/2021 | Oh ....................... H04N 5/2352 |
| 2021/0289128 A1* | 9/2021 | Dong ................... G06T 7/0012 |

OTHER PUBLICATIONS

Written Opinion (PCT/ISA/237) dated Oct. 18, 2021 by the International Searching Authority in International Application No. PCT/KR2021/008797.

* cited by examiner

ELECTRONIC DEVICE FOR ACQUIRING IMAGE BY USING LIGHT-EMITTING MODULE HAVING POLARIZING FILTER AND METHOD FOR CONTROLLING SAME

CROSS-REFERENCE TO RELATED APPLICATION(S)

This application is based on and claims priority under 35 U.S.C. 119 to Korean Patent Application No. 10-2020-0084784, filed on Jul. 9, 2020, and Korean Patent Application No. 10-2021-0002848, filed on Jan. 8, 2021, in the Korean Intellectual Property Office, the disclosures of which are incorporated by reference herein in their entireties.

BACKGROUND

1. Field

The disclosure relates to an electronic device for acquiring an image by using a light-emitting module having a polarizing filter, and a method for controlling the same.

2. Description of Related Art

Various services and additional functions have been increasingly provided through electronic devices (for example, smartphones). For example, a user may obtain a condition of his/her skin based on an image analysis through an electronic device (for example, a smartphone). Therefore, there is a need for development of a technology related to skin analysis in line with continuously increasing demands for skin condition monitoring and convenient use of skin care devices without having to visit specialized clinics.

SUMMARY

Provided are an electronic device capable of providing a function for photographing a user's skin image while changing the amount of output light from lighting, which has a polarizing filter, such that depth information regarding various features of skin (for example, wrinkles and/or pores) may be acquired.

Also provided are an electronic device capable of providing a function to capture a user's skin image while changing the amount of output light from lighting, which has a polarizing filter, such that the user's skin condition may be analyzed (for example, the relative amount of oil on the skin may be measured).

According to an aspect of the disclosure, there is provided an electronic device including: a display; a camera; a first light emitting module, wherein each of the camera and the first light emitting module comprises a first type polarizing filter; a second light emitting module including a second type polarizing filter that is different from the first type polarizing filter; and at least one processor configured to: obtain a first image by using the camera, based on a first light output from the first light emitting module and a second light output from the second light emitting module; identify at least one feature point in the first image; and control the display to display the first image and information related to the at least one feature point.

The at least one processor may be further configured to obtain a second image by using the camera, based on the first light only.

The at least one processor may be further configured to obtain a third image by using the camera, based on the second light only.

The first type polarizing filter may be configured to remove a substantially horizontally vibrating component from the first light.

The second type polarizing filter may be configured to remove a substantially vertically vibrating component from the second light.

The at least one processor may be further configured to generate a depth map of the at least one feature point by using the first image, the second image, and the third image.

The at least one processor may be further configured to: identify whether a target area is in a saturation state; and based on the target area not being in the saturation state, control the camera to capture the first image including the target area.

The at least one processor may be further configured to control the first light emitting module and the second light emitting module such that an amount of the first light and an amount of the second light have a particular ratio.

The at least one processor may be further configured to: obtain a plurality of images of a skin based on different ratios between an amount of the first light and an amount of the second light; identify a ratio between the amount of the first light and the amount of the second light, at which a corresponding image has a ratio of a saturation area that is equal to or greater than a threshold ratio, among the plurality of images; and provide information on a state of the skin based on the identified ratio between the amount of the first light and the amount of the second light.

At least one of the first type polarizing filter and the second type polarizing filter may be rotatable.

According to an aspect of the disclosure, there is provided a method for controlling an electronic device, the method including: obtaining a first image by using a camera of the electronic device, based on a first light output from a first light emitting module of the electronic device and a second light output from a second light emitting module of the electronic device; identifying at least one feature point in the first image; and providing the first image and information related to the at least one feature point through a display of the electronic device, wherein each of the camera and the first light emitting module includes a first type polarizing filter, and wherein the second light emitting module includes a second type polarizing filter different from the first type polarizing filter.

The method may further include obtaining a second image by using the camera based on the first light only.

The method may further include obtaining a third image by using the camera based on the second light only.

The first type polarizing filter may be configured to remove a substantially horizontally vibrating component from the first light.

The second type polarizing filter may be configured to remove a substantially vertically vibrating component from the second light.

The method may further include generating a depth map of the at least one feature point by using the first image, the second image, and the third image.

The method may further include identifying whether a target area is in a saturation state; and based on the target area not being in the saturation state, controlling the camera to capture the first image including the target area.

The method may further include controlling the first light emitting module and the second light emitting module such that an amount of the first light and an amount the second light have a particular ratio.

The method may further include obtaining a plurality of images of a skin based on different ratios between an amount of the first light and an amount of the second light; identifying a ratio between the amount of the first light and the amount of the second light, at which a corresponding image has a ratio of a saturation area that is equal to or greater than a threshold ratio, among the plurality of images; and providing information on a state of the skin based on the identified ratio between the amount of the first light and the amount of the second light.

At least one of the first type polarizing filter and the second type polarizing filter may be rotatable.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Figure 1A:
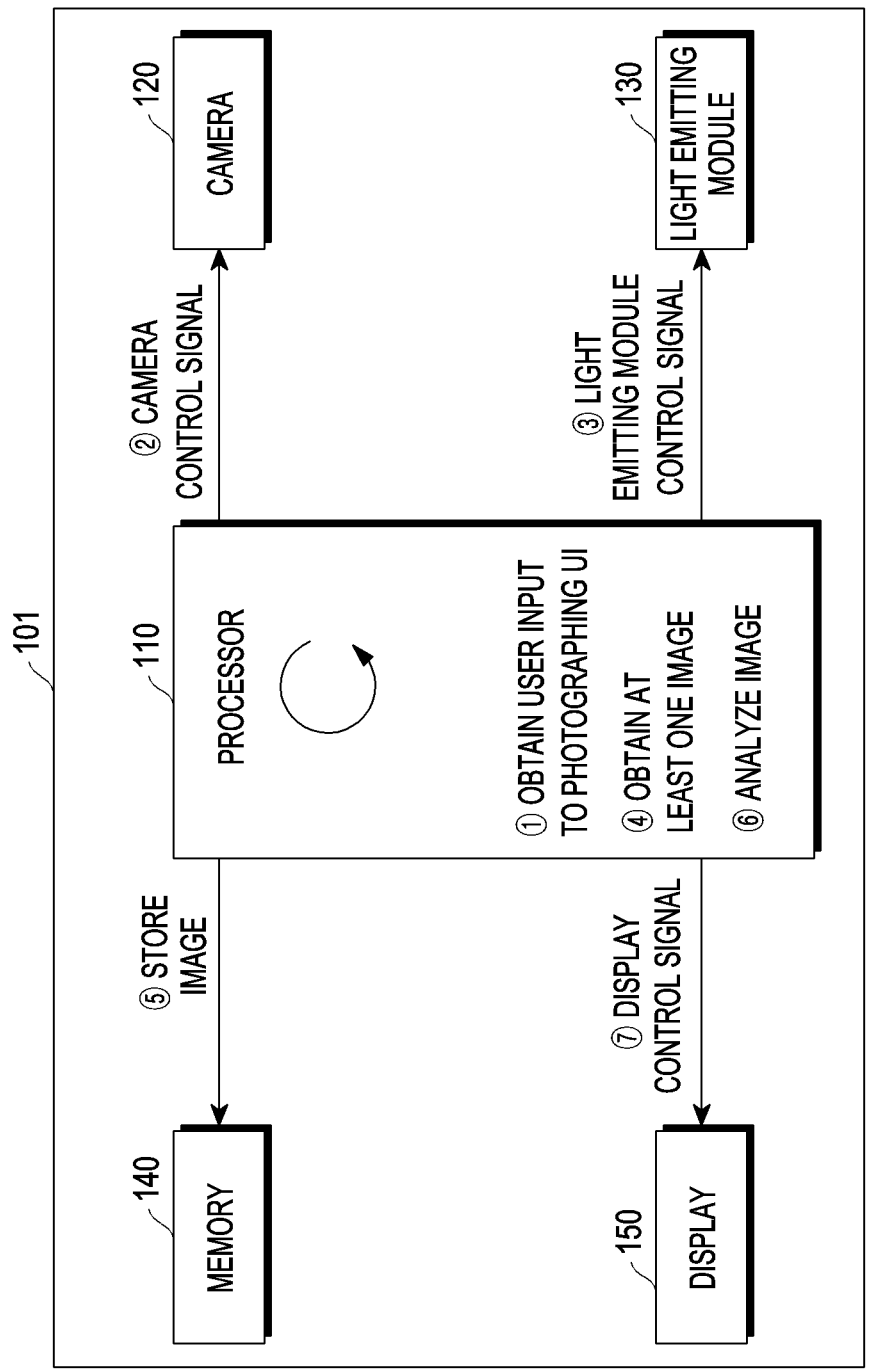
FIG. 1A is a block diagram illustrating a configuration of an electronic device according to an embodiment.

Hereinafter, embodiments will be described with reference to the accompanying drawings. Like components will be denoted by like reference numerals throughout the specification.

Figure 1B:
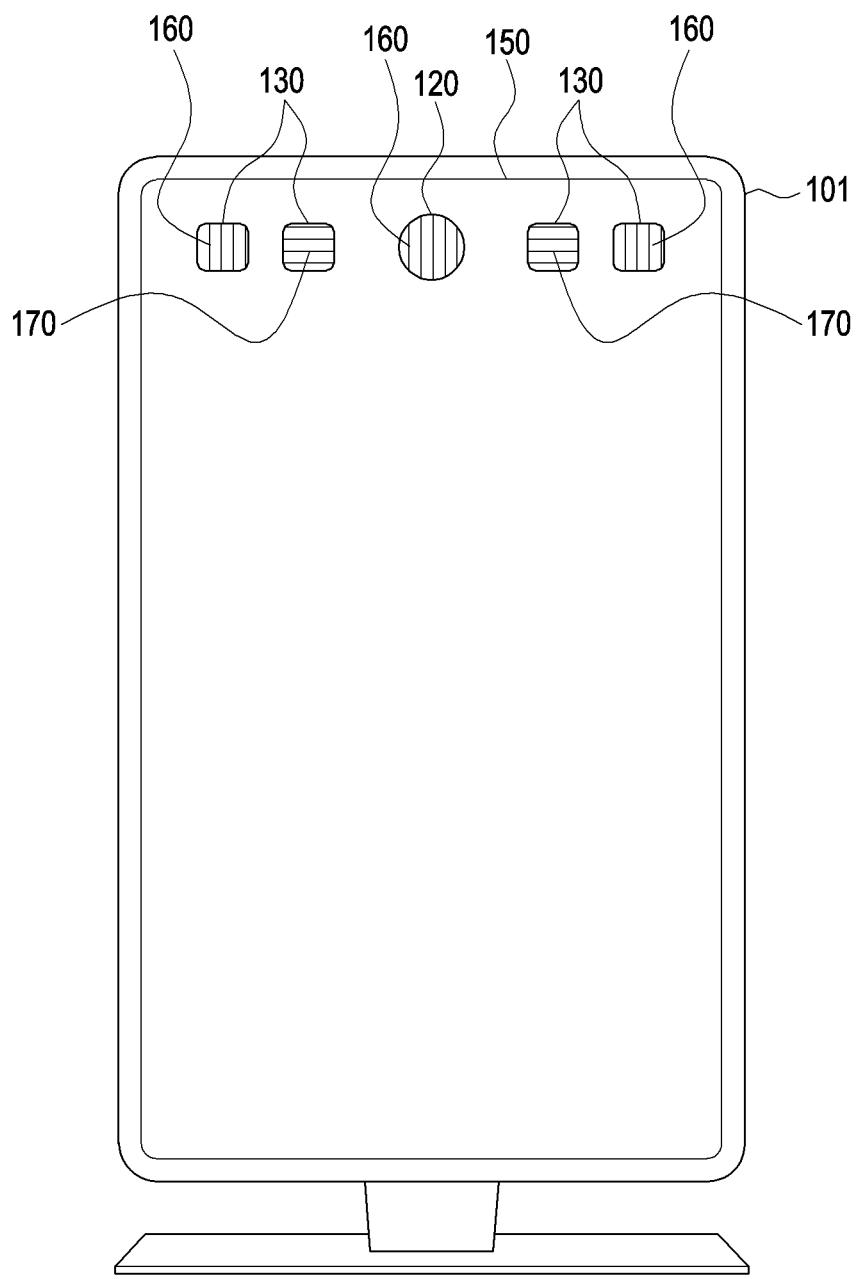
FIG. 1B is a schematic diagram illustrating an electronic device according to an embodiment.
Figure 2A:
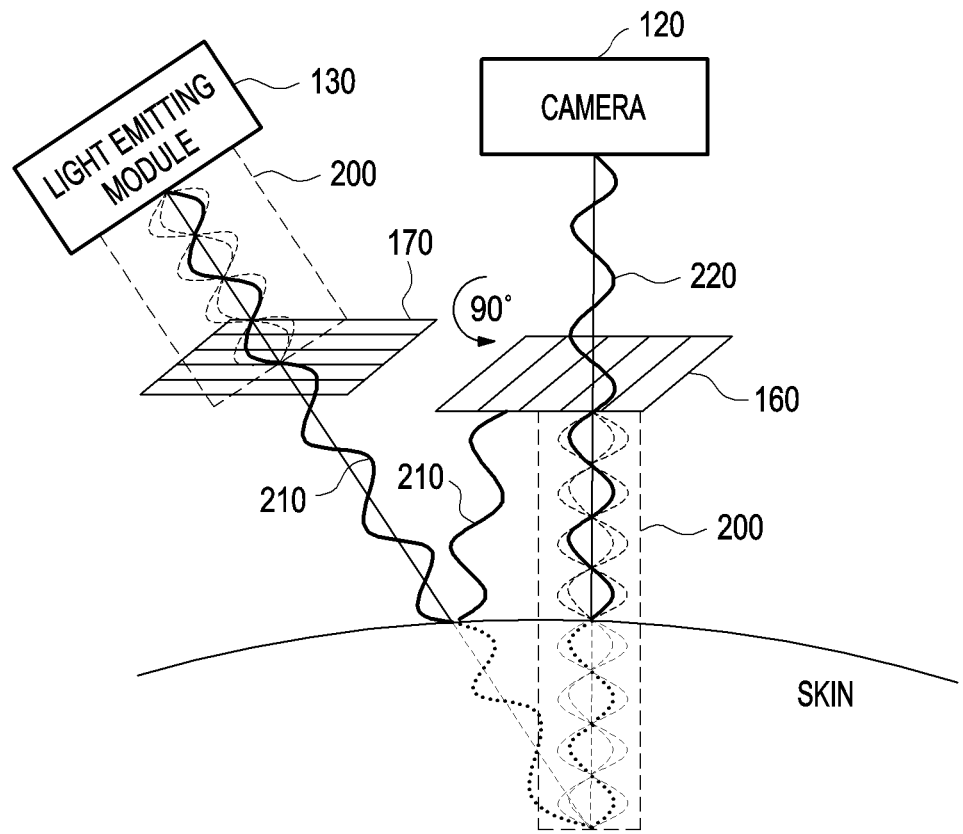
FIG. 2A illustrates an operation obtaining a cross polarization image according to an embodiment.
Figure 2B:
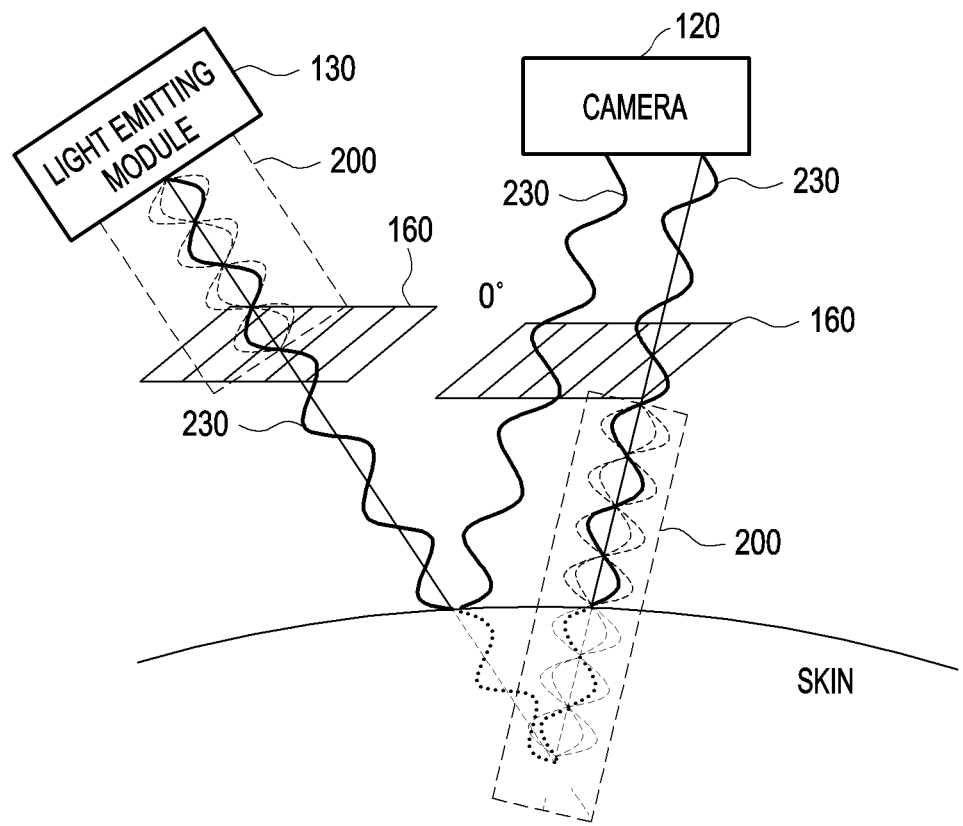
FIG. 2B illustrates an operation obtaining a parallel polarization image according to an embodiment.

FIG. 1A is a block diagram illustrating a configuration of an electronic device 101 according to an embodiment, and FIG. 1B is a schematic diagram illustrating the electronic device 101 according to an embodiment. FIG. 2A illustrates an operation obtaining a cross polarization image according to an embodiment. FIG. 2B illustrates an operation obtaining a parallel polarization image according to an embodiment.

Referring to FIG. 1A and FIG. 1B, the electronic device 101 according to an embodiment may include: a processor 110; a camera 120; a light emitting module 130; a memory 140; and a display 150. According to an embodiment, some of the elements may be implemented as one integrated circuit. For example, the camera 120 and the light emitting module 130 may be implemented by being embedded in the display 150. According to an embodiment, at least some of the elements in FIG. 1A may be omitted and not included in the electronic device 101.

Referring to FIG. 1B, the camera 120 and the light emitting module 130 are provided on a surface (e.g., a front surface) of the electronic device 101. In FIG. 1B, one camera 120 and four light emitting modules 130 are shown; however, this is merely an example and the embodiments are not limited thereto. The camera 120 includes a first type polarizing filter 160, and each of the light emitting modules 130 includes the first type polarizing filter 160 or a second type polarizing filter 170, which will be described later.

The processor 110 according to an embodiment may, for example, execute software (e.g., a program) to control at least another element (e.g., a hardware or software element) of the electronic device 101 connected to the processor 110, and perform various data-processing operations or calculations. According to an embodiment, the processor 110 may load, in the memory 140, a command and/or data obtained from another element, process the command and/or data stored in the memory 140, and store resultant data in the memory 140. According to an embodiment, the processor 110 may include a main processor (e.g., a central processing device or an application processor), and an auxiliary processor (e.g., a graphics processing device, an image signal processor, a sensor hub processor, or a communication processor) which may be operated independently from or together with the main processor. Additionally or alternatively, the auxiliary processor may be configured to use lower power than the main processor or to specialize in a designated function. The auxiliary processor according to an embodiment may be implemented separately from the main processor, or as a part thereof. The auxiliary processor may, for example, control at least some of functions or states related to at least one element (e.g., the display 150 or the camera 120) among the elements of the electronic device 101 on behalf of the main processor while the main processor is in an inactive (e.g., sleep) state, or together with the main processor while the main processor is in an active (e.g., application execution) state. According to an embodiment, the auxiliary processor (e.g., an image signal processor) may be implemented as a part of another element (e.g., the camera 120) that is functionally related to the auxiliary processor.

A related art skin photographing device separately has lighting for cross polarization which is used for highlighted photography of the inside of skin (for example, a layer of the dermis), normal lighting for analyzing pores and/or wrinkles, and lighting for parallel polarization which is used for highlighted photography of a skin surface. Therefore, in order to analyze the user's skin condition, it is necessary to successively control respective types of lighting included in the related art photographing device (for example, output light), thereby acquiring the user's skin image. In addition, various types of lighting included in the related art skin photographing device occupy a considerable area of the device, thereby increasing the relative size of the device.

To solve this problem, an embodiment may provide an electronic device capable of providing a function to capture the user's skin image while changing the amount of output light from lighting, which has a polarizing filter, such that, even without having normal lighting (for example, lighting that has no polarizing filter), an image substantially identical to a skin image captured by using normal lighting (for example, an image having substantially the same pixel intensity) may be acquired.

The processor 110 according to an embodiment may obtain, via a user interface (UI) a user input for capturing an image, while a part (e.g., the face) of a user's body is displayed in the display 150 (operation ① in FIG. 1A). According to an embodiment, the user input may include various inputs such as a touch input on a user interface displayed on the display 150, a push input on a physical button included in an external electronic device operably connected to the electronic device 101, and/or a touch input on a virtual button included in an external electronic device.

After the user input for capturing an image is obtained, the processor 110 according to an embodiment may transmit a camera control signal to the camera 120 (operation ② in FIG. 1A). In addition, after the user input for capturing an image is obtained, the processor 110 may transmit a light emitting module control signal to the light emitting module 130 substantially at the same time as that of the camera control signal (operation ③ in FIG. 1A). The camera control signal according to an embodiment may include an electrical signal for capturing (e.g., photographing) a part of a user's body, which is currently displayed on the display 150. The light emitting module control signal according to an embodiment may include at least one signal among a signal for controlling an output of the light emitting module 130 to obtain a cross polarization image (this may be herein referred to as "first type image"), a signal for controlling the light emitting module 130 to obtain a parallel polarization image (this may be herein referred to as "second type image"), and a signal for controlling the light emitting module 130 to obtain a normal light image (this may be herein referred to as "third type image").

Figure 3A:
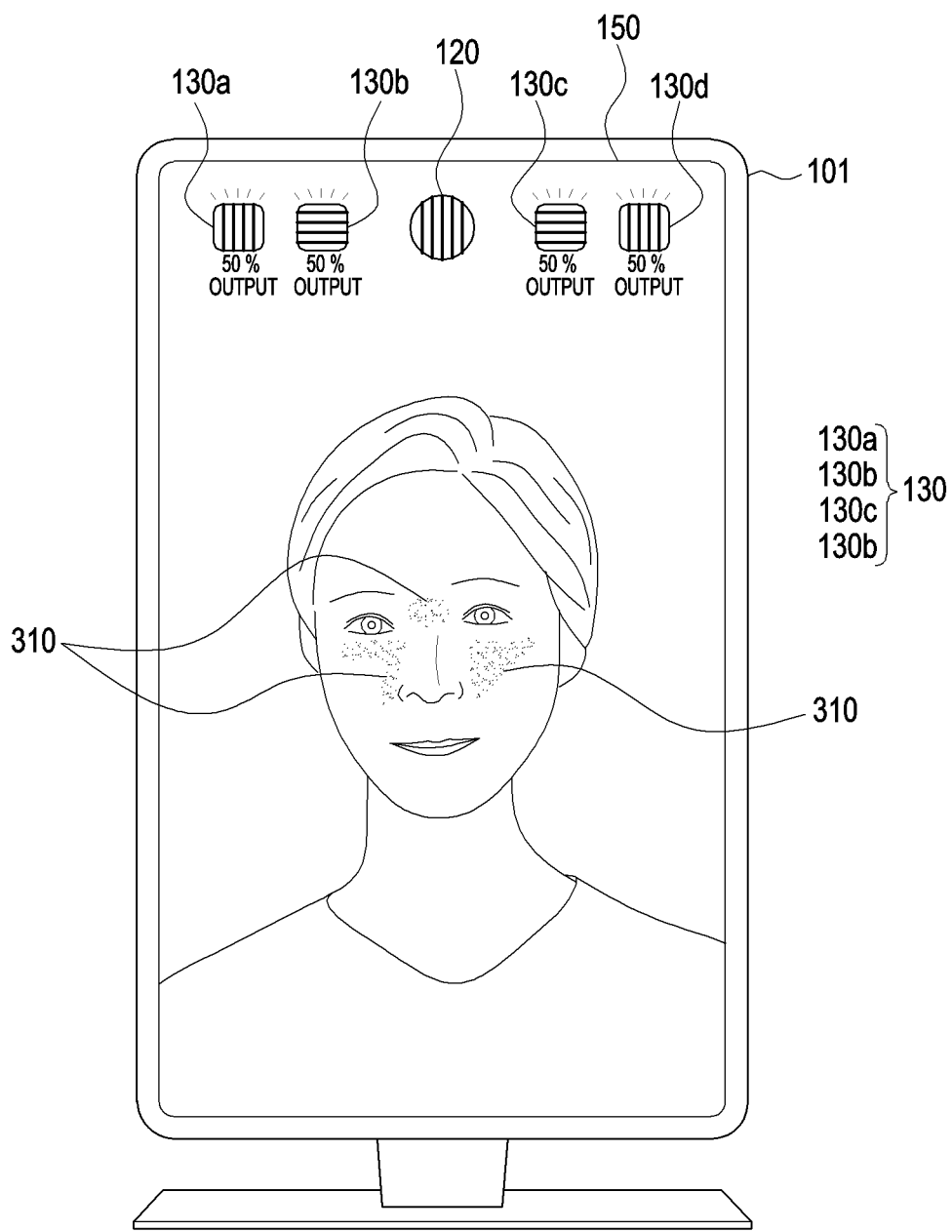
FIGS. 3A, 3B, and 3C illustrate obtaining various types of an image according to embodiments.
Figure 3B:
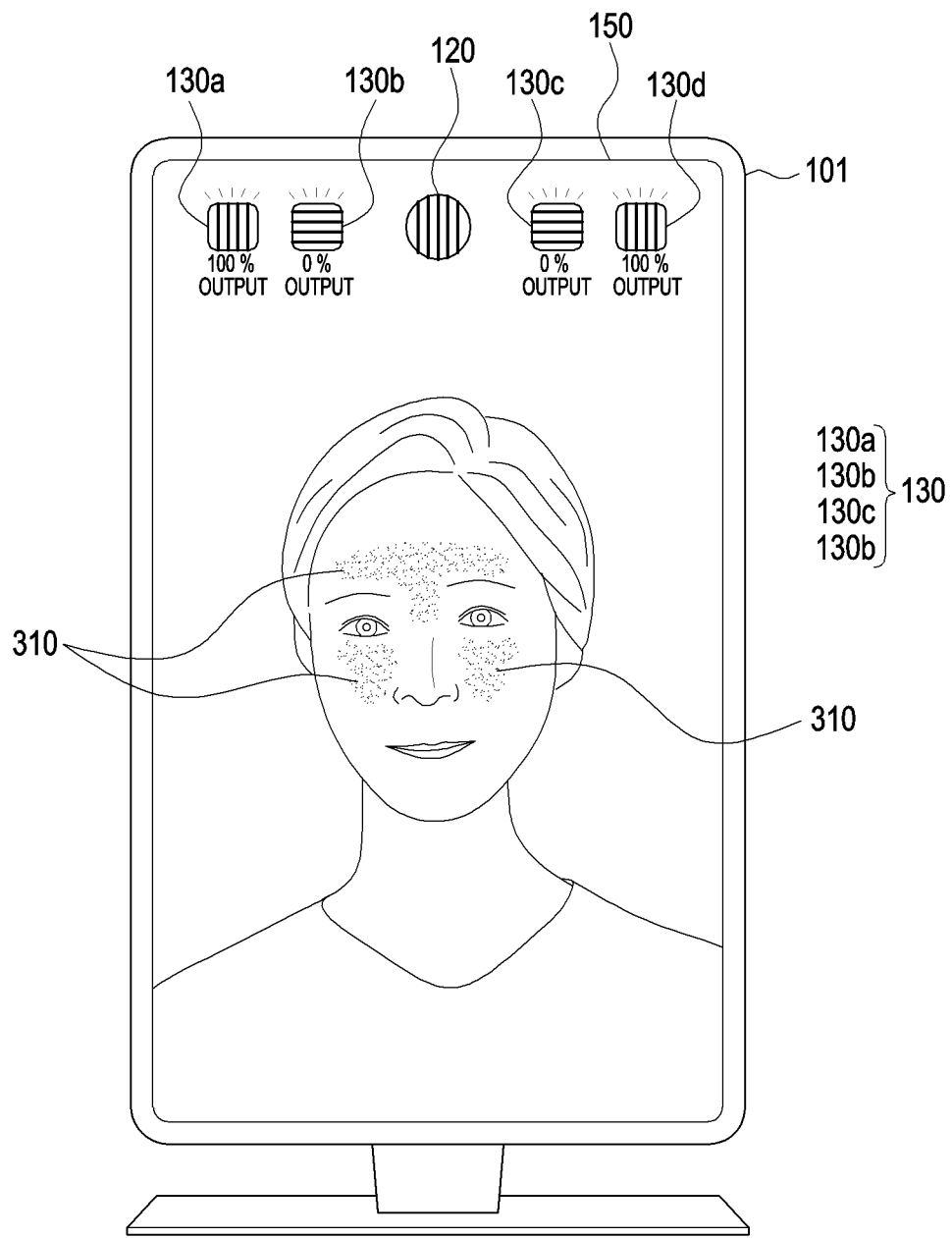
Figure 3C:
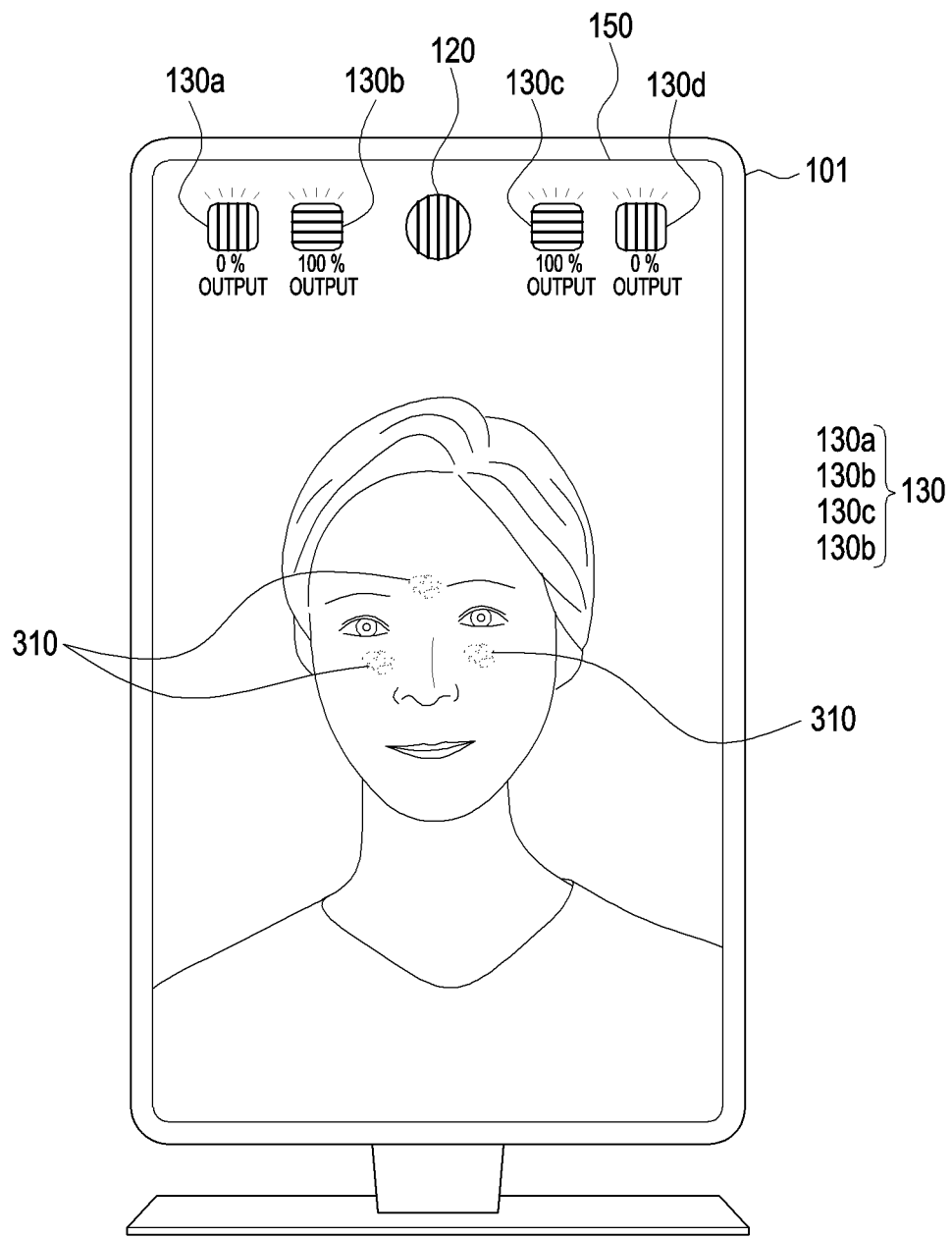

A first type image according to an embodiment may refer to an image that is captured in a state where a light emitting module (e.g., a second light emitting module 130b and a third light emitting module 130c as shown in FIGS. 3A-3C) including the second type polarizing filter 170 completely outputs light (e.g., 100%), and a light emitting module (e.g., a first light emitting module 130a and a fourth light emitting module 130d as shown in FIGS. 3A-3C) including the first type polarizing filter 160 does not output light. The first type polarizing filter 160 according to an embodiment may include a polarizing filter configured to remove a substantially horizontally vibrating component from light (e.g., depolarized light) output from the light emitting module 130. The second type polarizing filter 170 according to an embodiment may include a polarizing filter configured to remove a substantially vertically vibrating component from light output from the light emitting module 130.

Referring to FIG. 2A, cross polarization capturing according to an embodiment may correspond to a case where light is output from the light emitting module including the second type polarizing filter 170, and light is input to the camera 120 including the first type polarizing filter 160. Therefore, the first type image may refer to an image captured from light which is output from the light emitting module (e.g., the second light emitting module 130b and the third light emitting module 130c) including the second type polarizing filter 170 (e.g., light 210 obtained by removing the vertically vibrating component from depolarized light 200), and which is reflected by a skin (e.g., the surface of the skin), or which is scattered while passing through the skin (e.g., a layer of the dermis) such that at least a part of the scattered light being input into the camera 120 including the first type polarizing filter 160. According to an embodiment, light reflected from the skin may be blocked by a filter (e.g., the first type polarizing filter 160) of the camera 120. According to an embodiment, light reflected from the skin (e.g., the surface of the skin) may substantially maintain the components before the reflection. However, light scattered by passing through the skin (e.g., a layer of the dermis) may substantially have the properties of depolarized light.

A second type image according to an embodiment may include an image captured in a state where a light emitting module (e.g., the first light emitting module 130a and the fourth light emitting module 130d) including the first type polarizing filter 160 completely outputs light (e.g., 100%), and a light emitting module (e.g., the second light emitting module 130b and the third light emitting module 130c) including the second type polarizing filter 170 does not output light.

Referring to FIG. 2B, parallel polarization according to an embodiment may mean polarization of a case where light is output from the light emitting module 130 and is input to the camera 120 through polarizing filters which are substantially parallel to each other (in other words, the filters are of the same type). Therefore, the second type image may refer to an image that is captured from light which is output from the light emitting module (e.g., the first light emitting module 130a and the fourth light emitting module 130d) including the first type polarizing filter 160 (e.g., light 230 obtained by removing the horizontally vibrating component from depolarized light 200), and which is reflected by a skin (e.g., the surface of the skin) or is scattered while passing through the skin (e.g., a layer of the dermis) such that the light being input into the camera 120 including the first type polarizing filter 160. According to an embodiment, light reflected from the skin (e.g., the surface of the skin) may substantially maintain the components before the reflection. However, light scattered by passing through the skin (e.g., a layer of the dermis) may substantially have the properties of depolarized light. A third type image according to an embodiment may refer to an image that is captured in a state where each of light emitting modules (e.g., the first light emitting module 130a, the second light emitting module 130b, the third light emitting module 130c, and the fourth light emitting module 130d) outputs light according to a designated ratio (e.g., 50%). The term "normal light image" used herein may refer to an image that is captured using an illumination device (e.g., a light emitting module which outputs depolarized light) that does not include a polarizing filter (e.g., the first type polarizing filter 160 or the second type polarizing filter 170). As described above, according to an embodiment, even if there is no light emitting module that outputs normal light (e.g., light that is output without using a polarizing filter), an image substantially identical to that obtained using a light emitting module that outputs normal light may be obtained. Here, the term "substantially identical image" may refer to an image in which one or more elements configuring the image, such as a pixel value and/or contrast, are substantially identical to that of a compared image.

The processor 110 according to an embodiment may obtain at least one image (operation ④ in FIG. 1A). The processor 110 may obtain at least one image among a first type image, a second type image, and a third type image. The processor 110 may obtain at least one image among a first type image, a second type image, and a third type image according to a user's configuration (or a user's selection). For example, in a case where only a cross polarization image is to be captured according to the user's configuration, the processor 110 may transmit, to the camera 120 and the light emitting module 130, a camera control signal and a light emitting control signal to obtain only a first type image, respectively, and then may obtain the first type image. The processor 110 may obtain at least one image among a first type image, a second type image, and a third type image according to the purpose of image capturing. For example, in a case where the purpose of capturing selected by a user is to determine pigmentation of a skin, the processor 110 may transmit, to the camera 120 and the light emitting module 130, a camera control signal and a light emitting control signal to obtain only a first type image, respectively, and then may obtain the first type image. Alternatively, in a case where the purpose of capturing selected by a user is to determine the degree of fine wrinkles in a particular portion, the processor 110 may transmit, to the camera 120 and the light emitting module 130, a camera control signal and a light emitting control signal to obtain only a second type image, respectively, and then may obtain the second type image.

The processor 110 according to an embodiment may store the obtained image in the memory 140 (operation ⑤ in FIG. 1A). The processor 110 may temporarily store the obtained image in the memory 140.

The processor 110 according to an embodiment may analyze the obtained image (operation ⑥ in FIG. 1A). The processor 110 may identify various feature points, such as wrinkles, scars, pores, and/or pigmented portions, in a captured image. For example, the processor 110 may identify, as a wrinkle, a line connecting pixel values of the image, which are relatively lower than those in other portions around the pixel values. As described above, the processor 110 may identify various feature points, such as wrinkles, scars, pores, and/or pigmented portions, by using the pixel values of an image. Various other technologies for identifying feature points may be applied to an embodiment. The processor 110 may identify a user's face in the captured image. The processor 110 may perform image capturing by using, as a trigger, whether a user's face has been recognized. Alternatively, the processor may display various feature points, such as wrinkles, scars, pores, and/or pigmented portions, on an identified face image. The processor 110 may detect a user's face by using various algorithms for detecting a face including, for example but not limited to, principal component analysis (PCA) using an eigenface, linear discriminate analysis (LDA), elastic bunch graph matching, hidden Markov models, multilinear subspace learning using a tensor expression, and/or neuronal motivated dynamic link matching.

The processor 110 according to an embodiment may transmit a display control signal to the display 150 (operation ⑦ in FIG. 1A). The display control signal according to an embodiment may include an electrical signal for displaying information on at least one identified feature point. For example, in a case where the purpose of image capturing is to identify the density of pores, the display control signal according to an embodiment may include a signal for displaying an image (e.g., a third type image) captured in a normal light mode, and a signal for displaying information (e.g., "There is a relatively large number of large pores") of identified pores. Alternatively, in a case where the purpose of image capturing is to identify pigmented portions, the display control signal according to an embodiment may include a signal for displaying an image (e.g., a first type image) captured in a cross-polarized light mode, and a signal for displaying information (e.g., "This is a severely pigmented portion") of an identified pigmented portion. Alternatively, in a case where the purpose of image capturing is to identify a portion with a relatively large number of fine winkles, the display control signal according to an embodiment may include a signal for displaying an image (e.g., a second type image) captured in a parallel-polarized light mode, and a signal for displaying information (e.g., "This is a portion with a relatively large number of fine winkles") of a portion with a lot of fine winkles.

The camera 120 according to an embodiment may capture a still image or a moving image. According to an embodiment, the camera 120 may include one or more lenses, image sensors (e.g., a charge coupled device (CCD) and a CMOS device (CMOS)), image signal processors, and/or flashes. The camera 120 according to an embodiment may include at least one polarizing filter among the first type polarizing filter 160 and the second type polarizing filter 170. According to an embodiment, the first type polarizing filter 160 or the second type polarizing filter 170 may be attached to a surface of a lens of the camera 120, or disposed close to the lens. The camera 120 according to an embodiment may receive a camera control signal from the processor 110. The camera control signal according to an embodiment may include an electrical signal for capturing a part of a user's body, which is currently displayed on the display 150.

The light emitting module 130 according to an embodiment may include at least one light emitting diode. The light emitting module 130 may include one light emitting diode, or include a plurality of light emitting diodes. The light emitting module 130 may control the output of at least a part of the light emitting module according to a light emitting module control signal received from the processor 110. The light emitting module 130 may include multiple light emitting modules (e.g., the first light emitting module 130a, the second light emitting module 130b, the third light emitting module 130c, and the fourth light emitting module 130d) arranged on a front surface of the electronic device 101. The light emitting module 130 may be embedded in the display 150. Alternatively, the light emitting module 130 may be implemented such that at least a part of the light emitting module 130 is exposed through a hole included in the display 150. The number of the light emitting modules 130 included in the electronic device 101 may be variously changed. Each of the light emitting modules (e.g., the first light emitting module 130a, the second light emitting module 130b, the third light emitting module 130c, and the fourth light emitting module 130d) according to an embodiment may include the first type polarizing filter 160 or the second type polarizing filter 170. According to an embodiment, the number of at least one light emitting module including the first type polarizing filter 160 may be the same as that of at least one light emitting module including the second type polarizing filter 170. For example, if the number of light emitting modules including the first type polarizing filter 160 is two, the number of light emitting modules including the second type polarizing filter 170 may also be two. Similarly, if the number of light emitting modules including the first type polarizing filter 160 is one, the number of light emitting modules including the second type polarizing filter 170 may also be one. According to an embodiment, the first type polarizing filter 160 or the second type polarizing filter 170 may be attached to a surface of the light emitting module 130, or disposed close thereto. The light emitting module 130 according to an embodiment may be controlled based on a light emitting module control signal from the processor 110. The light emitting module control signal according to an embodiment may include at least one signal among a signal for controlling the light emitting module 130 to obtain a first type image, a signal for controlling the light emitting module 130 to obtain a second type image, and a signal for controlling the light emitting module 130 to obtain a third type image.

The memory 140 according to an embodiment may store various data used by at least one element (e.g., the processor 110 or the camera 120) of the electronic device 101. The data may include, for example, software (e.g., a program), and input data or output data related to a command related thereto. The memory 140 according to an embodiment may include a volatile memory and/or a non-volatile memory. A program may be stored in the memory as software, and may include, for example, an operating system, middleware, or an application. The memory 140 according to an embodiment may at least temporarily store an obtained image.

The display 150 according to an embodiment may visually provide information to the outside of the electronic device 101 (e.g., to a user). The display 150 may include, for example, a display, a hologram device, or a projector, as well as a control circuit for controlling a corresponding device. According to an embodiment, the display 150 may include circuitry configured to sense a touch, or sensor circuitry (e.g., a pressure sensor) configured to measure the level of force generated by the touch. The display 150 may obtain a display control signal from the processor 110. The display control signal according to an embodiment may include a signal for displaying an image (e.g., a third type image) captured in a normal light mode, and a signal for displaying information (e.g., "There is a relatively large number of large pores") of identified pores. Alternatively, the display control signal according to an embodiment may include a signal for displaying an image (e.g., a first type image) captured in a cross-polarized light mode, and a signal for displaying information (e.g., "This is a severely pigmented portion") of an identified pigmented portion. Alternatively, the display control signal according to an embodiment may include a signal for displaying an image (e.g., a second type image) captured in a parallel-polarized light mode, and a signal for displaying information (e.g., "This is a portion with a relatively large number of fine winkles") of a portion with a lot of fine winkles.

FIG. 3A illustrates an operation of obtaining a third type image according to an embodiment. Referring to FIG. 3A, the electronic device 101 according to an embodiment may allow each of the first light emitting module 130a, the second light emitting module 130b, the third light emitting module 130c, and the fourth light emitting module 130d to output light according to a designated output ratio (e.g., 50%) so as to obtain the third type image. The area (e.g., portion) of saturated (in other words, glossy) portions 310 may be larger in the third type image according to an embodiment than in the first type image, and may be smaller in the third type image than in the second type image. The electronic device 101 may display the third type image through the display 150. In an embodiment, the third type image may be used for the analysis of wrinkles and/or pores.

FIG. 3B illustrates an operation of obtaining a second type image according to an embodiment. Referring to FIG. 3B, the electronic device 101 according to an embodiment may allow each of the first light emitting module 130a and the fourth light emitting module 130d to output light according to the maximum output ratio (e.g., 100%) so as to obtain a second type image. However, the second light emitting module 130b and the third light emitting module 130c may be controlled by the electronic device 101 so as not to output light. The area of saturated (in other words, glossy) portions 310 may be larger in the second type image than in the first type image and the third type image. The electronic device 101 may display the second type image through the display 150. In an embodiment, the second type image may be used for the analysis of (fine) wrinkles.

FIG. 3C illustrates an operation of obtaining a first type image according to an embodiment. Referring to FIG. 3C, the electronic device 101 according to an embodiment may allow each of the second light emitting module 130b and the third light emitting module 130c to output light according to the maximum output ratio (e.g., 100%) so as to obtain the first type image. However, the first light emitting module 130a and the fourth light emitting module 130d may be controlled by the electronic device 101 so as not to output light. The area of saturated (in other words, glossy) portions 310 may be smaller in the first type image than in the second type image and a third type image. The electronic device 101 may display the first type image through the display 150. In an embodiment, the first type image may be mainly used for the analysis of a portion with pigmentation, troubles, and flushes.

Figure 4A:
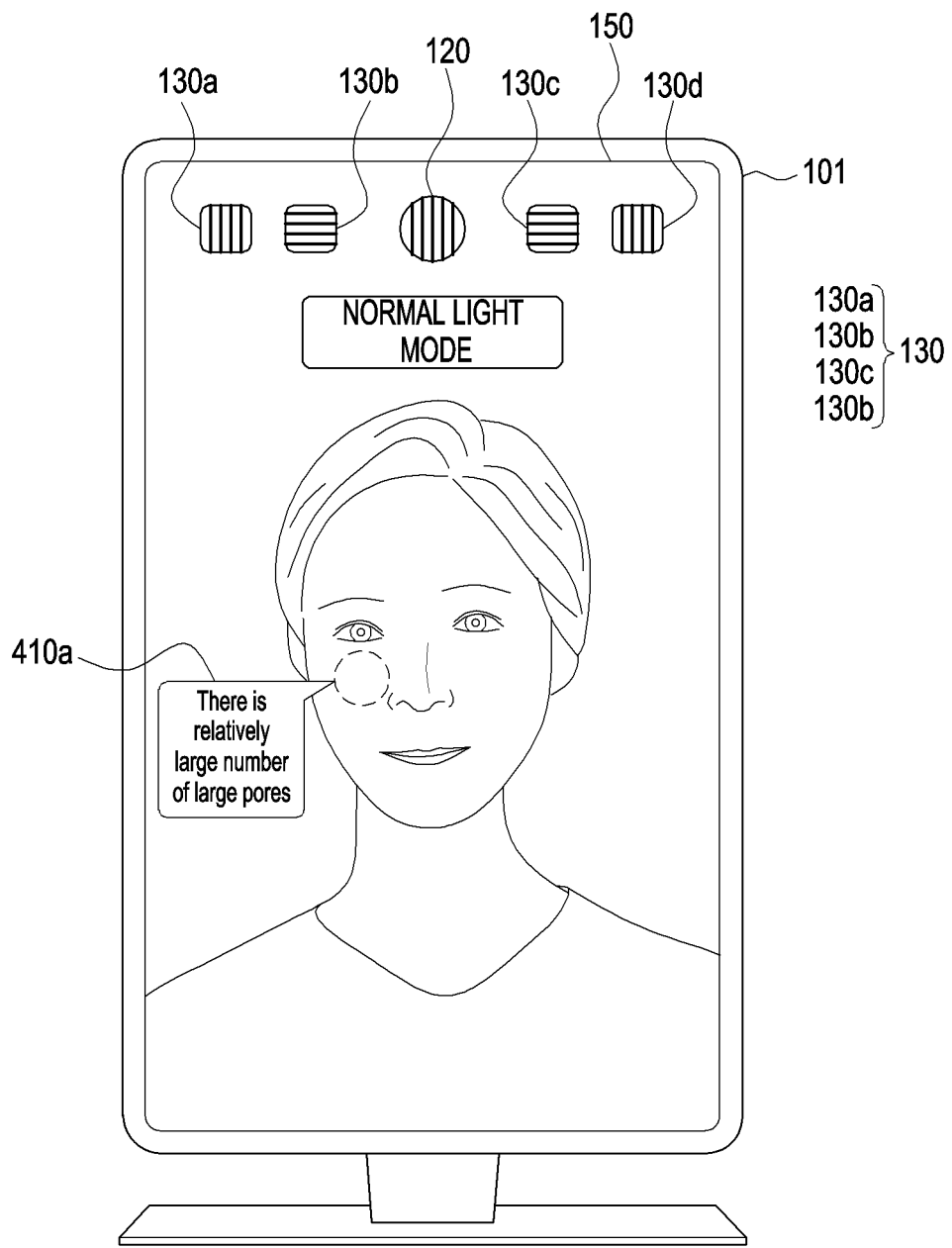
FIGS. 4A, 4B, and 4C illustrate an operation of providing a result of skin analysis through the electronic device 101, according to embodiments.
Figure 4B:
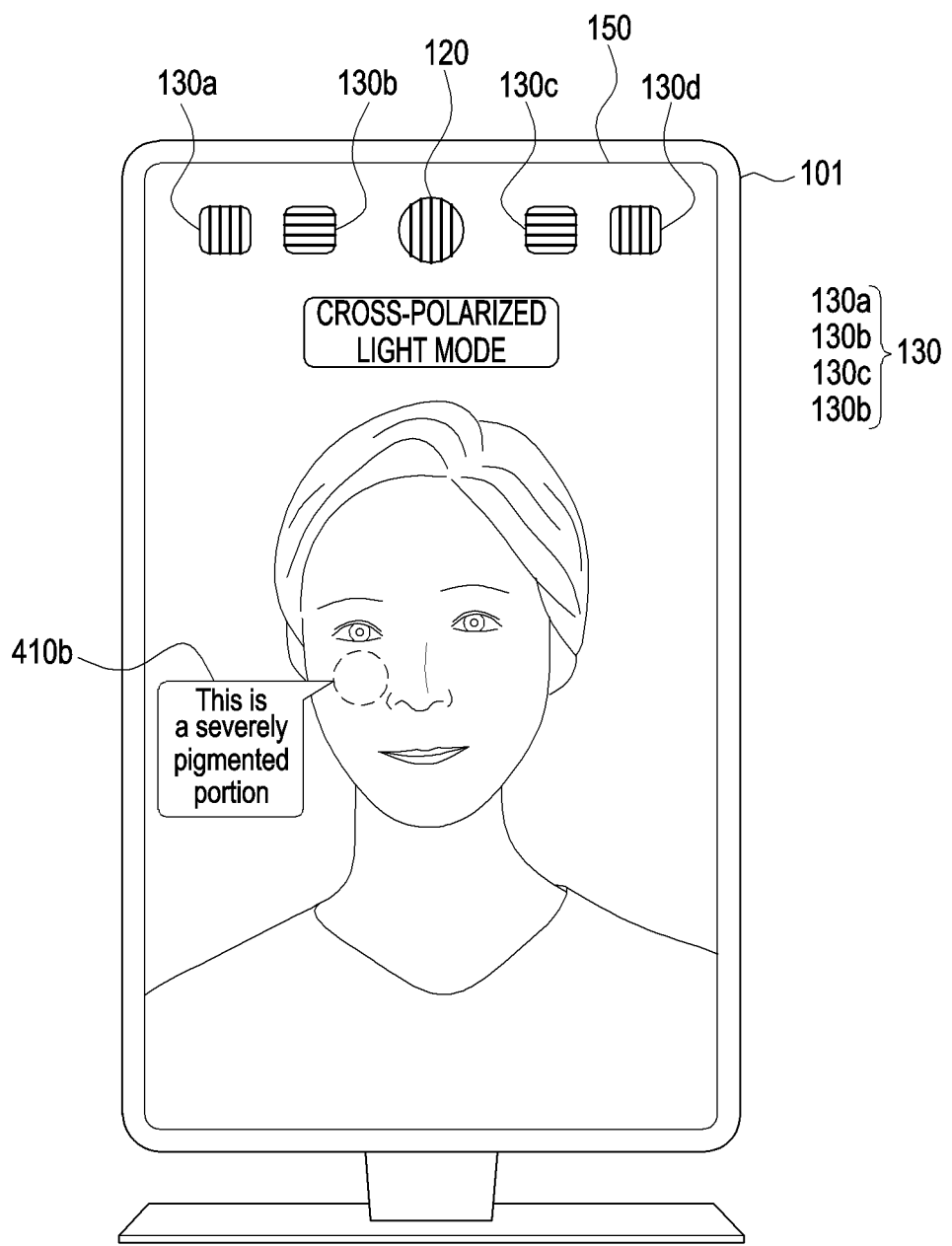
Figure 4C:
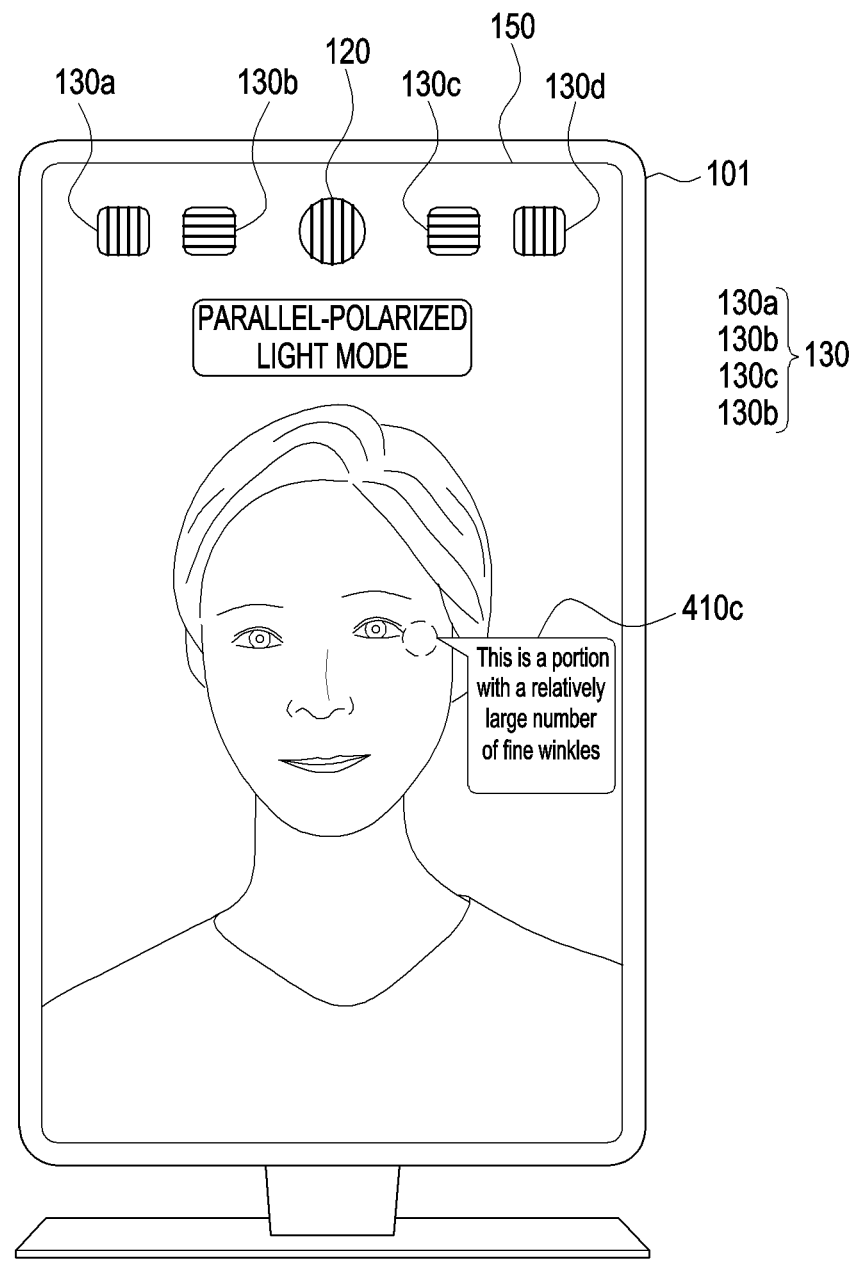

FIGS. 4A, 4B, and 4C illustrate an operation of providing a result of skin analysis through the electronic device 101, according to embodiments.

Referring to FIG. 4A, for example, in a case where the purpose of image capturing is to identify the density of pores, the electronic device 101 according to an embodiment may display, on the display 150, an image (e.g., a third type image) captured in a normal light mode, and first information 410a (e.g., "There is a relatively large number of large pores") of identified pores. Referring to FIG. 4B, for example, in a case where the purpose of image capturing is to identify pigmented portions, the electronic device 101 may display, on the display 150, an image (e.g., a first type image) captured in a cross-polarized light mode, and second information 410b (e.g., "This is a severely pigmented portion") of an identified pigmented portion. Referring to FIG. 4C, for example, in a case where the purpose of image capturing is to identify a portion with a relatively large number of fine winkles, the electronic device may display, on the display 150, an image (e.g., a second type image) captured in a parallel-polarized light mode, and third information 410c (e.g., "This is a portion with a relatively large number of fine winkles") of a portion with a lot of fine winkles. According to an embodiment, at least one image, and information related thereto (e.g., the first information 410a, the second information 410b, and/or the third information 410c) may be displayed together on the display 150 according to a user's selection.

The electronic device 101 according to an embodiment may use the number of pixels and/or the values of the pixels (e.g., pixel intensity) to analyze a user's skin. For example, the electronic device 101 may identify the size of a pore base on the number of pixels of which values correspond to the pore. A pixel value that corresponds to the pore may be preset. For example, the electronic device 101 may identify, as a pigmented portion, an area having pixel values equal to or lower than a particular threshold pixel value. For example, the electronic device 101 may identify the level of fine wrinkles through analyzing of a feature point.

Figure 5:
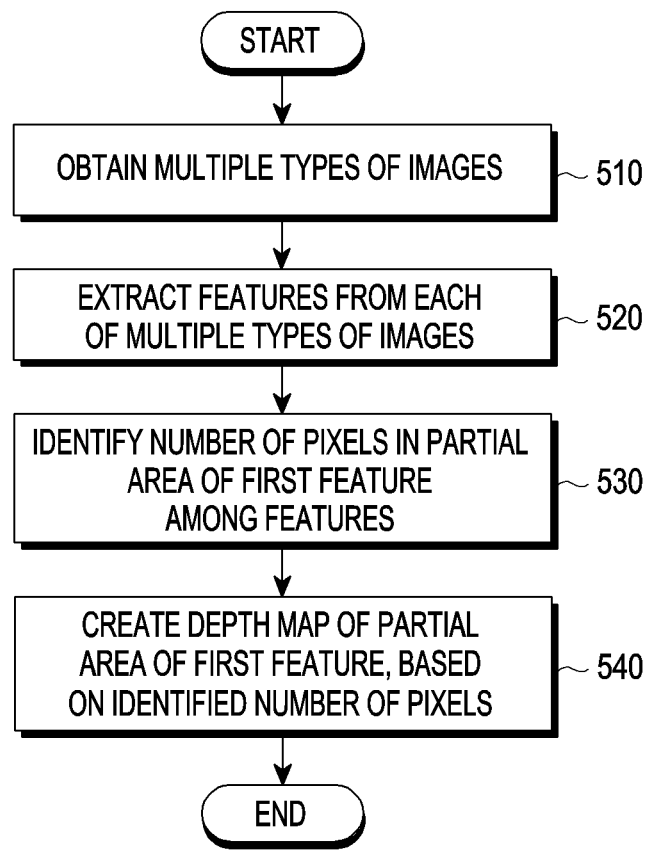
FIG. 5 is a flowchart illustrating an operation of obtaining depth information relating to at least one feature of a user's skin according to an embodiment.

FIG. 5 is a flowchart illustrating an operation of obtaining depth information relating to at least one feature of a user's skin according to an embodiment (e.g., creating a depth map). FIGS. 6A, 6B, 6C, 6D, 6E, and 6F are views for describing operations of identifying a number of pixels and creating a depth map in FIG. 5.

Referring to FIG. 5, the electronic device 101 according to an embodiment may obtain multiple types of images in operation 510. The multiple types of images according to an embodiment may include, for example, the first type image, the second type image, the third type image, as described above, a fourth type image (e.g., an image of 75% cross polarization+25% parallel polarization, in other words, an image captured in a state where the output of each of the first light emitting module 130*a* and the fourth light emitting module 130*d* is 25%, and the output of each of the second light emitting module 130*b* and the third light emitting module 130*c* is 75%) and a fifth type image (e.g., an image of 25% cross polarization+75% parallel polarization, in other words, an image captured in a state where the output of each of the first light emitting module 130*a* and the fourth light emitting module 130*d* is 75%, and the output of each of the second light emitting module 130*b* and the third light emitting module 130*c* is 25%). However, this is merely an example, and the electronic device 101 may further obtain other various types of images based on a different type and/or degree of polarization (e.g., an image of 60% cross polarization+40% parallel polarization, in other words, an image captured in a state where the output of each of the first light emitting module 130*a* and the fourth light emitting module 130*d* is 40%, and the output of each of the second light emitting module 130*b* and the third light emitting module 130*c* is 60%), or may not obtain at least one image among the first to fifth type images. The type and/or degree of polarization of the multiple types of images may be appropriately determined without limitation.

The electronic device 101 according to an embodiment may extract features from each of the multiple types of images in operation 520. The electronic device 101 may extract features from each of the multiple types of images by using various feature point detection algorithms (e.g., Harris corner response algorithm using corner response, scale invariant feature transform (SIFT), and/or histogram of oriented gradient (HOG) algorithm, etc.) for identifying at least one feature (e.g., at least one feature point) from a user's skin.

The electronic device 101 according to an embodiment may identify the number of pixels in a partial area 612 of a first feature 610 (e.g., one line of a palm) among multiple features (e.g., lines of the palm) in operation 530. The electronic device 101 may calculate the number of horizontal pixels having a pixel intensity corresponding to the first feature 610 in the partial area 612 of the first feature 610 for each of the multiple types of images, as illustrated in FIGS. 6A, 6B, 6C, 6D, and 6E. The number of the horizontal pixels of a second type image (e.g., a parallel polarization image) according to an embodiment may correspond to the width (e.g., "length ①" in FIG. 6F) of the first feature (e.g., a line of the palm). Similarly, the number of the horizontal pixels of the first type image (e.g., a cross polarization image) according to an embodiment may correspond to the width (e.g., "length ②" in FIG. 6F) of the first feature (e.g., a line of the palm).

Figure 6A:
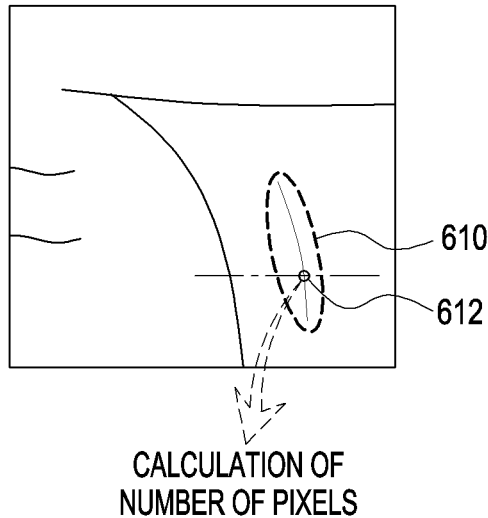
FIGS. 6A, 6B, 6C, 6D, 6E, and 6F are views for describing operations of identifying a number of pixels and creating a depth map in FIG. 5.
Figure 6B:
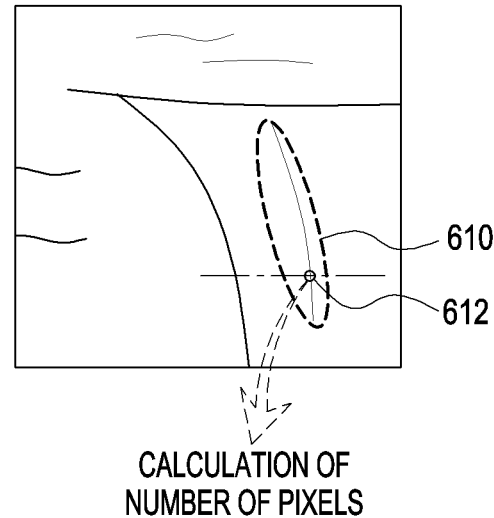
Figure 6C:
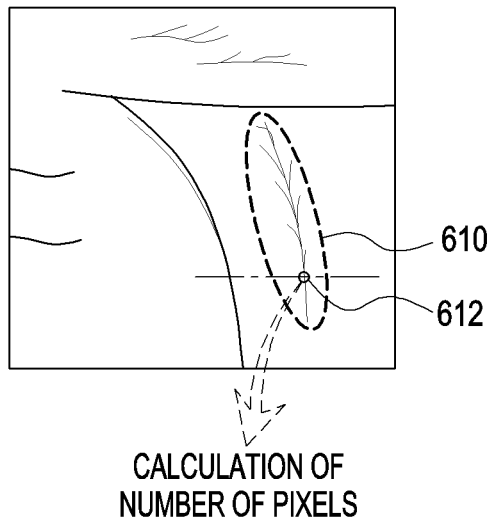
Figure 6D:
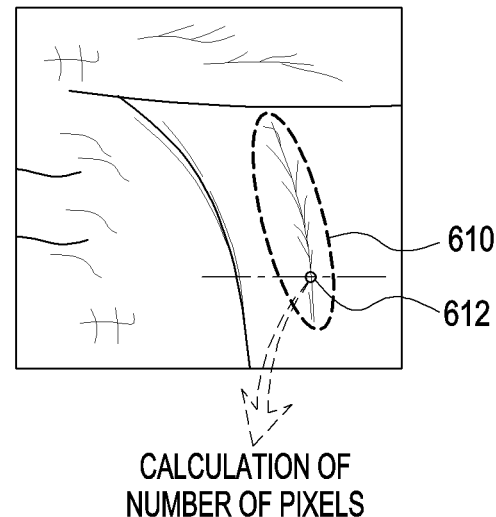
Figure 6E:
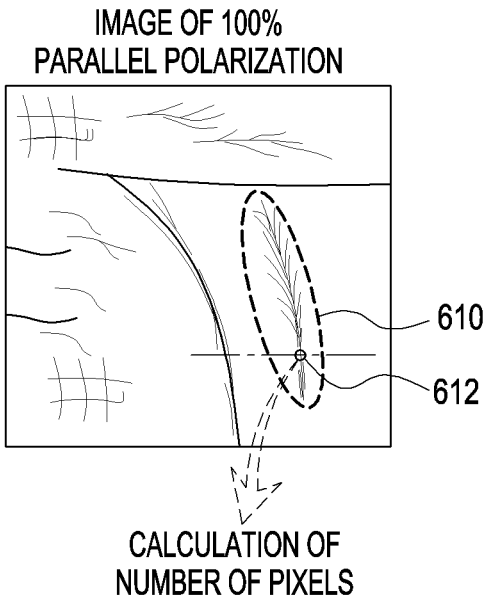
Figure 6F:
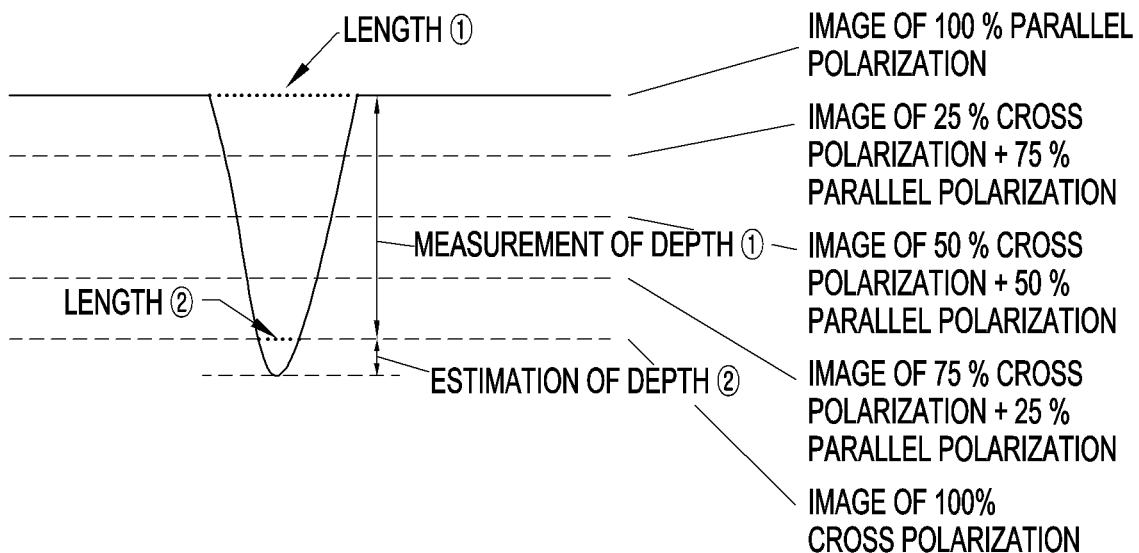

The electronic device 101 according to an embodiment may create a depth map of the partial area 612 of the first feature 610, based on the identified number of pixels, in operation 540. The electronic device 101 may estimate a depth shape of the first feature by stacking multiple images according to the identified number of pixels, as illustrated in FIG. 6F. For example, the electronic device 101 may place a first type image (e.g., an image of 100% cross polarization) on a first virtual pixel plane on which pixels are distributed. The electronic device 101 may place a fourth type image (e.g., an image of 75% cross polarization+25% parallel polarization) on a second virtual pixel plane spaced a predetermined gap from the first virtual pixel plane, correspondingly to the identified number of pixels (in other words, the horizontal length of the line of the palm). The electronic device 101 may obtain information on the difference in height between the first type image and the fourth type image based on information on the predetermined gap (in other words, information on the height between the first and the second virtual pixel planes). The electronic device 101 may place a third type image (e.g., an image of 50% cross polarization+50% parallel polarization) on a third virtual pixel plane spaced a predetermined gap from the second virtual pixel plane, correspondingly to the identified number of pixels (in other words, the horizontal length of the line of the palm). The electronic device 101 may obtain information on the difference in height between the fourth type image and the third type image based on the predetermined gap (in other words, information on the height between the second and the third virtual pixel planes). According to the method as described above, multiple images are stacked, and then the heights between each type of images are added up, so that information on depth ① may be obtained. That is, multiple images are sequentially stacked according to the number of horizontal pixels (e.g., length ① and length ②) (in other words, the multiple images are stacked according to a particular rule).

Therefore, the electronic device 101 may measure the depths (e.g., depth ①) of the stacked images. The electronic device 101 may estimate depth ②, based on a correlation among length ①, length ② and depth ①. For example, in a case where the number of the pixels corresponding to length ① is 10, the number of the pixels corresponding to length ② is 2, and measured depth ① is 0.5 millimeters (mm), the electronic device 101 may estimate 0.1 mm as depth ② by using a proportional expression. The electronic device 101 may add up measured depth ① and estimated depth ② to create a depth map of the partial area 612 of the first feature 610. The electronic device 101 may create a depth map of other features (e.g., wrinkles or pores, etc.) by using the scheme as described above. The electronic device 101 may provide information on a created depth map to a user through the electronic device 101. For example, the electronic device 101 may display a notification message, such as "the depth of the deepest wrinkle is 0.6 millimeters", through the display 150. Alternatively, the electronic device 101 may display a notification message including a guidance message, such as "You have a lot of deep wrinkles. Try infrared skin care devices", through the display 150.

Figure 7:
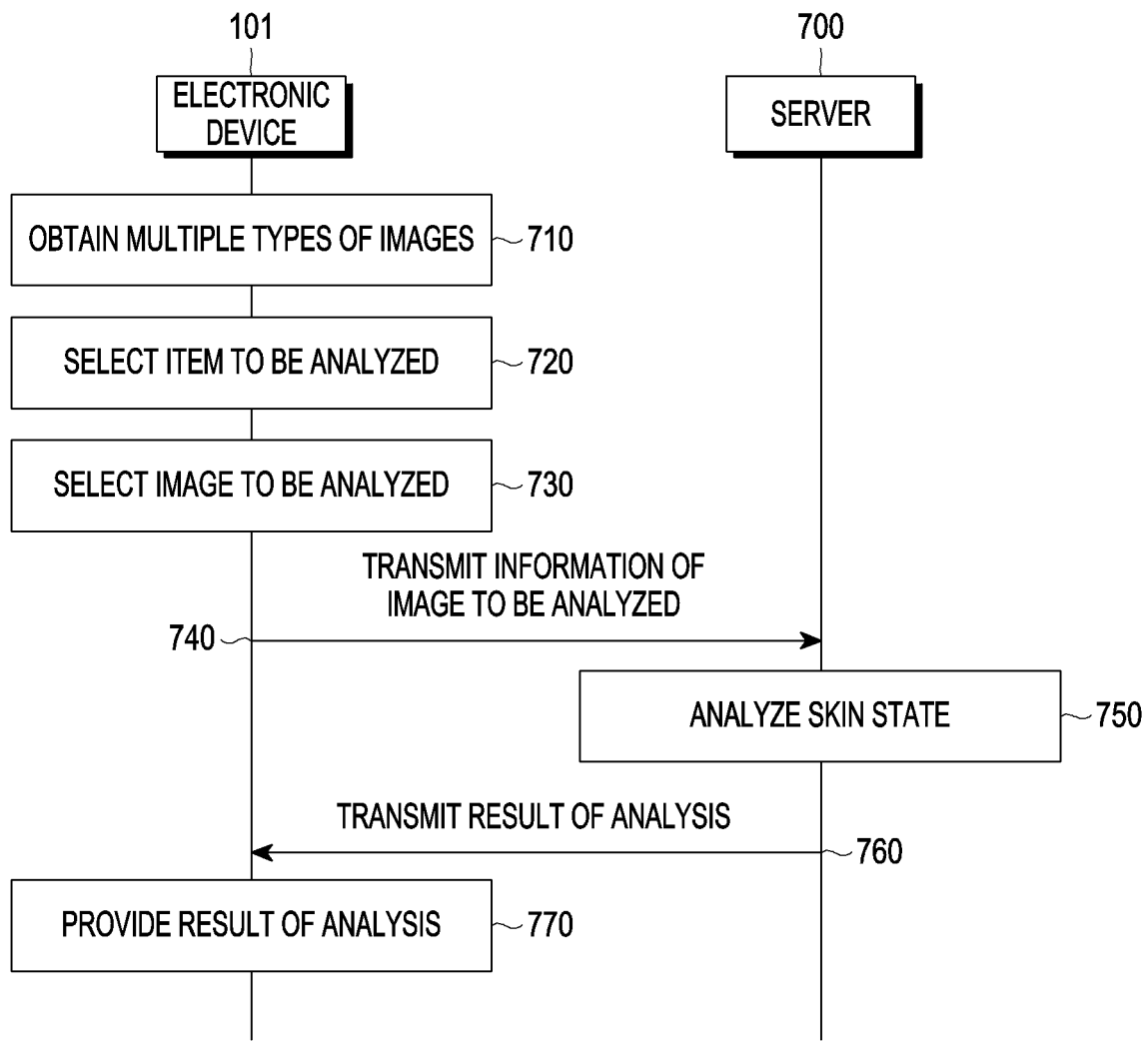
FIG. 7 is a flowchart illustrating an operation of providing a skin analysis result according to an embodiment.

FIG. 7 is a flowchart illustrating an operation of providing a skin analysis result according to an embodiment.

Referring to FIG. 7, the electronic device 101 according to an embodiment may obtain multiple types of images in operation 710. The multiple types of images according to an embodiment may include, for example, a first type image, a second type image, a third type image, a fourth type image (e.g., an image of 75% cross polarization+25% parallel polarization, in other words, an image captured in a state where the output of each of the first light emitting module 130a and the fourth light emitting module 130d is 25%, and the output of each of the second light emitting module 130b and the third light emitting module 130c is 75%) and a fifth type image (e.g., an image of 25% cross polarization+75% parallel polarization, in other words, an image captured in a state where the output of each of the first light emitting module 130a and the fourth light emitting module 130d is 75%, and the output of each of the second light emitting module 130b and the third light emitting module 130c is 25%). However, this is merely an example, and the electronic device may further obtain other various types of images based on a different type and/or degree of polarization (e.g., an image of 60% cross polarization+40% parallel polarization, in other words, an image captured in a state where the output of each of the first light emitting module 130a and the fourth light emitting module 130d is 40%, and the output of each of the second light emitting module 130b and the third light emitting module 130c is 60%), or may not obtain at least one image among the first to fifth type images. The type and/or degree of polarization of the multiple types of images may be appropriately determined without limitation.

The electronic device 101 according to an embodiment may select an item to be analyzed, in operation 720. For example, the electronic device 101 may receive an input to select an item, the analysis of which is desired by a user, such as "the level of fine wrinkles", "the state of pores and texture of the skin", or "pigmentation and troubles".

The electronic device 101 according to an embodiment may select an image to be analyzed, in operation 730. The electronic device 101 may select, among the multiple images, an image to be analyzed, which is suitable for an item, the analysis of which is desired by a user. For example, if a user selects an item "the level of fine wrinkles", the electronic device 101 may select a second type image (e.g., an image of 100% parallel polarization) among the multiple images. As another example, if a user selects an item "the state of pores", the electronic device 101 may select a third type image (e.g., an image of 50% cross polarization+50% parallel polarization) among the multiple images. As yet another example, if a user selects an item "pigmentation", the electronic device 101 may select a first type image (e.g., an image of 100% cross polarization) among the multiple images. The electronic device 101 may transmit information on the image to be analyzed, to the server 700 in operation 740.

The server 700 according to an embodiment may analyze a user's skin state by using the information on the image to be analyzed, which is obtained from the electronic device 101, in operation 750. The server 700 may analyze a user's skin state by using various skin analysis algorithms. The server 700 may use the number of pixels and/or the values of the pixels (e.g., pixel intensity) to analyze a user's skin. For example, the server 700 may identify the size of a pore based on the number of pixels of which values correspond to the pore. For example, the server 700 may identify, as a pigmented portion, an area having pixel values equal to or lower than a particular threshold pixel value. For example, the server 700 may identify the level of fine wrinkles through analyzing of a feature point. The server 700 may transmit a result of the analysis to the electronic device in operation 760.

The electronic device 101 according to an embodiment may provide the result of the analysis in operation 770. For example, if a user selects an item "the state of pores", the electronic device 101 may display, on the display 150, an image (e.g., a third type image) captured in a normal light mode, and first information 410a (e.g., "There is a relatively large number of large pores") of identified pores as shown in FIG. 4A. For example, if a user selects an item "pigmentation", the electronic device 101 may display, on the display 150, an image (e.g., a first type image) captured in a cross-polarized light mode, and second information 410b (e.g., "This is a severely pigmented portion") of an identified pigmented portion as shown in FIG. 4B. For example, if a user selects an item "the level of fine winkles", the electronic device may display, on the display 150, an image (e.g., a second type image) captured in a parallel-polarized light mode, and third information 410c (e.g., "This is a portion with a relatively large number of fine winkles") of a portion with a lot of fine winkles as shown in FIG. 4C.

According to another embodiment, operation 720 may be performed before operation 710. For example, if an input to select an item, the analysis of which is desired by a user, is received, the electronic device 101 may capture an image suitable for the item, the analysis of which is desired by the user, and then transmit the image to the server 700.

Figure 8:
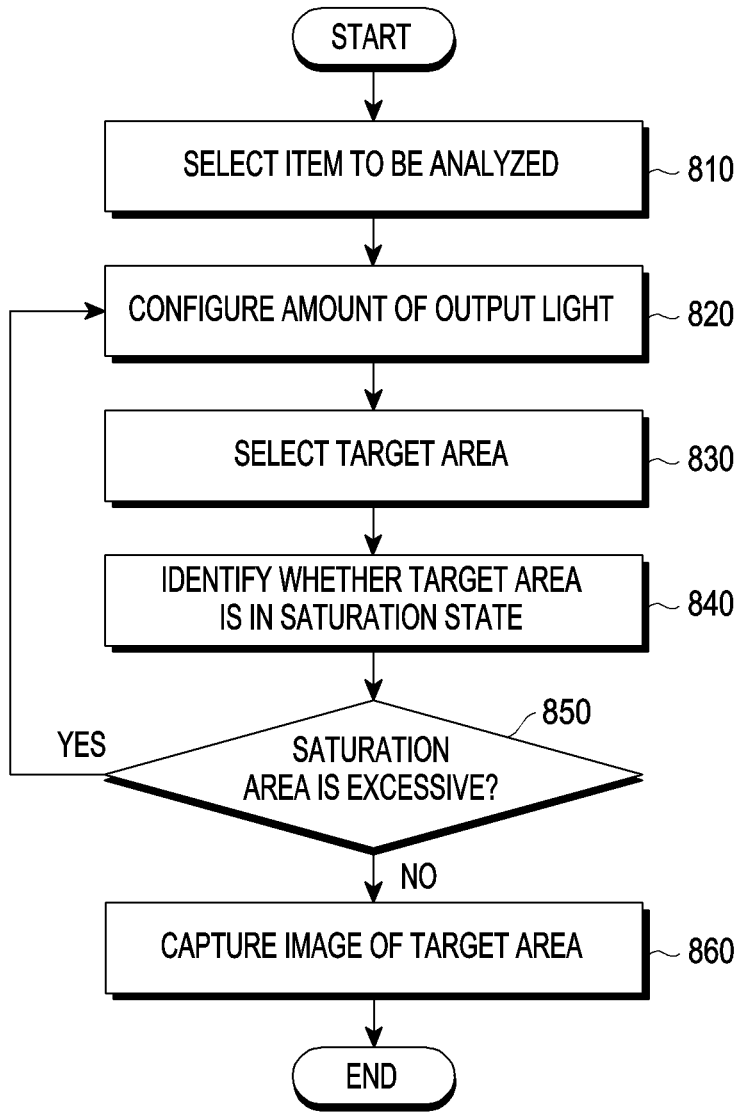
FIG. 8 is a flowchart illustrating an operation of capturing an image of a target area according to an embodiment.
Figure 9A:
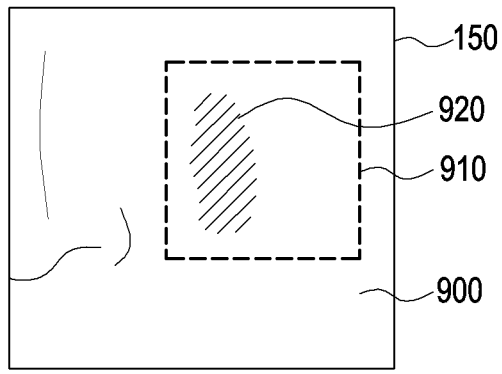
FIGS. 9A and 9B are views for describing an operation of determining whether a target area in an image is in a saturation state in FIG. 8.
Figure 9B:
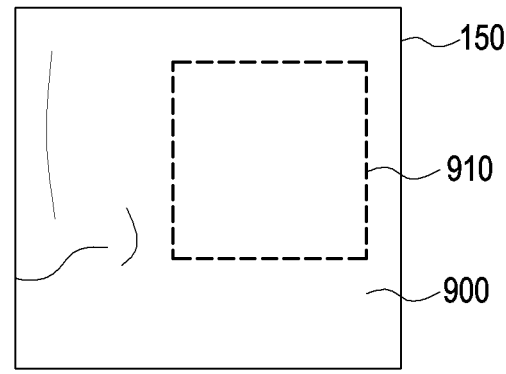

FIG. 8 is a flowchart illustrating an operation of capturing an image of a target area according to an embodiment. FIGS. 9A and 9B are views for describing an operation of determining whether a target area in an image is in a saturation state.

The electronic device 101 according to an embodiment may receive an input to select an item to be analyzed, in operation 810. For example, the electronic device 101 may receive an input to select an item, the analysis of which is desired by a user, such as "the level of fine wrinkles around the cheeks", "the state of pores around the cheeks" or "the level of pigmentation around the cheeks".

The electronic device 101 according to an embodiment may configure the amount of output light in operation 820. The electronic device 101 may configure the amount of output light according to the purpose of image capturing. For example, if a user selects an item "the level of fine wrinkles around the cheeks", the electronic device 101 may determine the amount of output light to be the amount of output light for obtaining an image of 100% parallel polarization. For example, if a user selects an item "the state of pores around the cheeks", the electronic device 101 may determine the amount of output light to be the amount of output light for obtaining an image of 50% cross polarization+50% parallel polarization. For example, if a user selects an item "the level of pigmentation around the cheeks", the electronic device 101 may determine the amount of output light to be the amount of output light for obtaining an image of 100% cross polarization and obtain an image 900 of a part of the user's body. For example, the image 900 may be a live preview image (that is, obtained before capturing operation).

The electronic device 101 according to an embodiment may select (in other words, detect or recognize) a target area 910 (e.g., a cheek portion) in the obtained image 900, in operation 830, and may identify whether the target area 910 is in a saturation state, in operation 840. The electronic device 101 may identify a saturation state area 920 in the target area 910 (e.g., a cheek portion) that corresponds to a user's selection in operation 810. The electronic device 101 may identify, as the saturation state area 920, an area having a pixel value, that is, the value (e.g., pixel intensity) of at least one pixel among RGB pixels, which is 255.

The electronic device 101 according to an embodiment may determine whether the saturation area 920 is excessive, in operation 850. For example, the electronic device 101 may determine whether the ratio of the saturation area 920 to the image 900 of the part of the user's body is equal to or larger than a designated ratio (e.g., 0.1%). For example, if the ratio of the saturation area 920 to the image 900 of the part of the user's body is equal to or larger than the designated ratio (e.g., 0.1%), the electronic device 101 may determine that the saturation area 920 is in an excessive state.

If it is determined that the saturation area 920 is in an excessive state (operation 850-Yes), the electronic device 101 according to an embodiment may re-perform operation 820. In other words, the electronic device 101 may re-configure the amount of output light. For example, the electronic device 101 may adjust the amount of output light to be changed into the amount of output light for obtaining "an image of 70% cross polarization+30% parallel polarization" as illustrated in FIG. 9B, so as to reduce the ratio of the saturation area 920. After re-configuring the amount of output light, the electronic device 101 may re-perform the operations after operation 830. If it is determined that the saturation area 920 is not in an excessive state (operation 850-No), the electronic device 101 may capture an image of the target area, and analyze the skin state of the target area. Through the above operations, an image obtained by removing the components of excessive light reflection or glossiness on the surface of skin is used to perform skin analysis, so that the accuracy of skin analysis may be improved.

Figure 10:
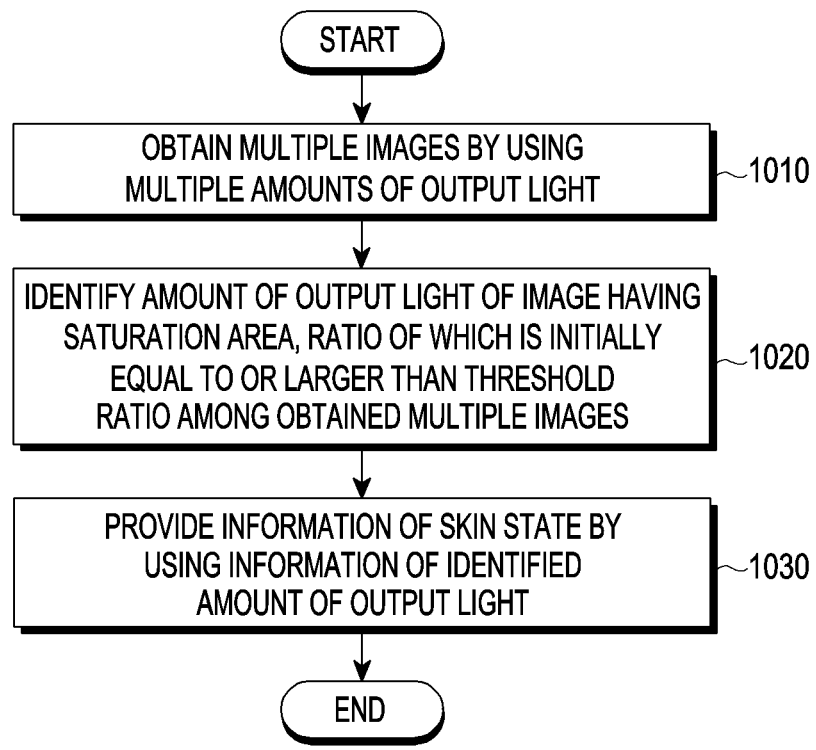
FIG. 10 is a flowchart illustrating an operation of identifying a user's skin state based on a ratio of a saturation area according to an embodiment.
Figure 11A:
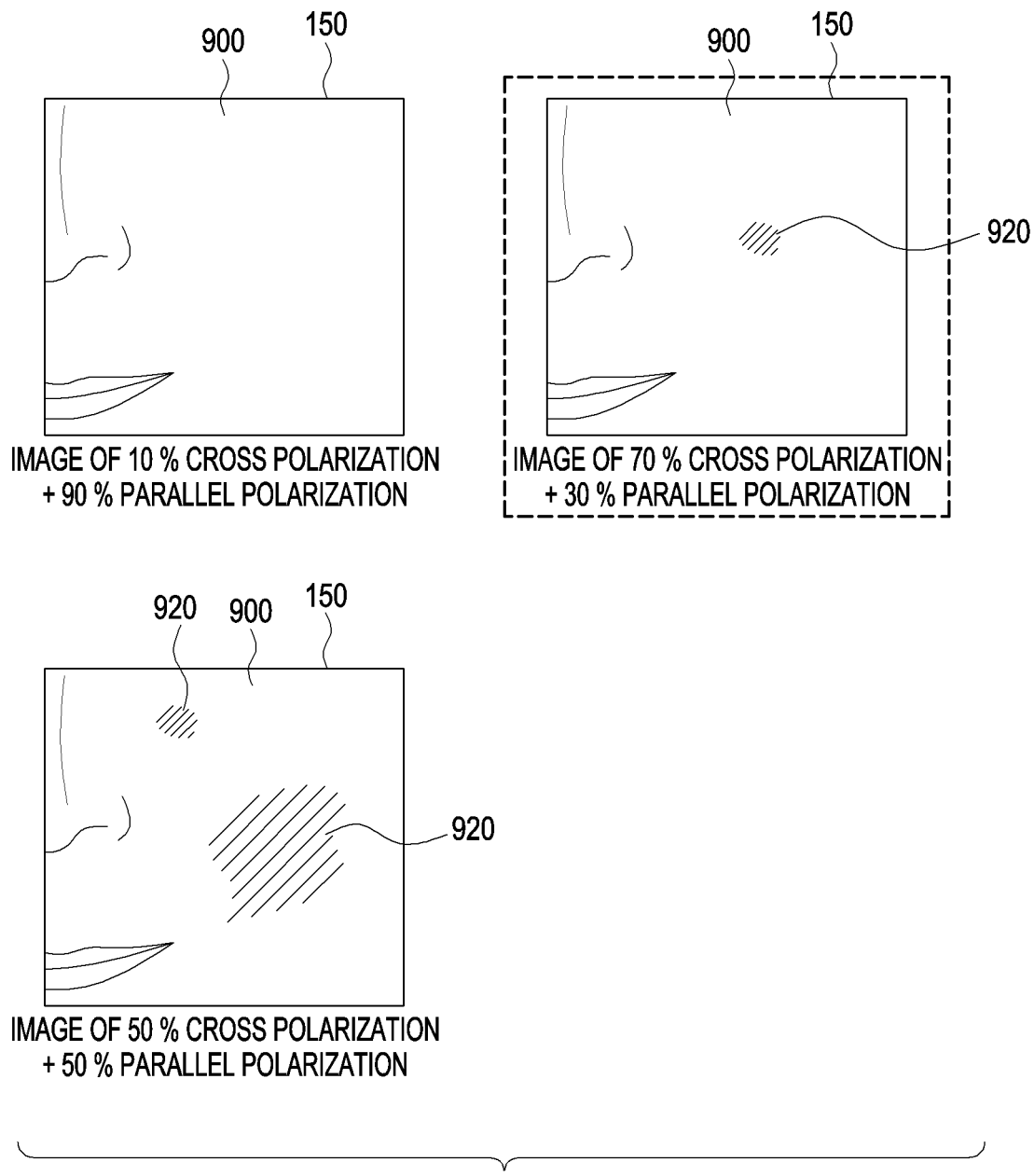
FIG. 11A is a view for describing operation 1020 in FIG. 10.
Figure 11B:
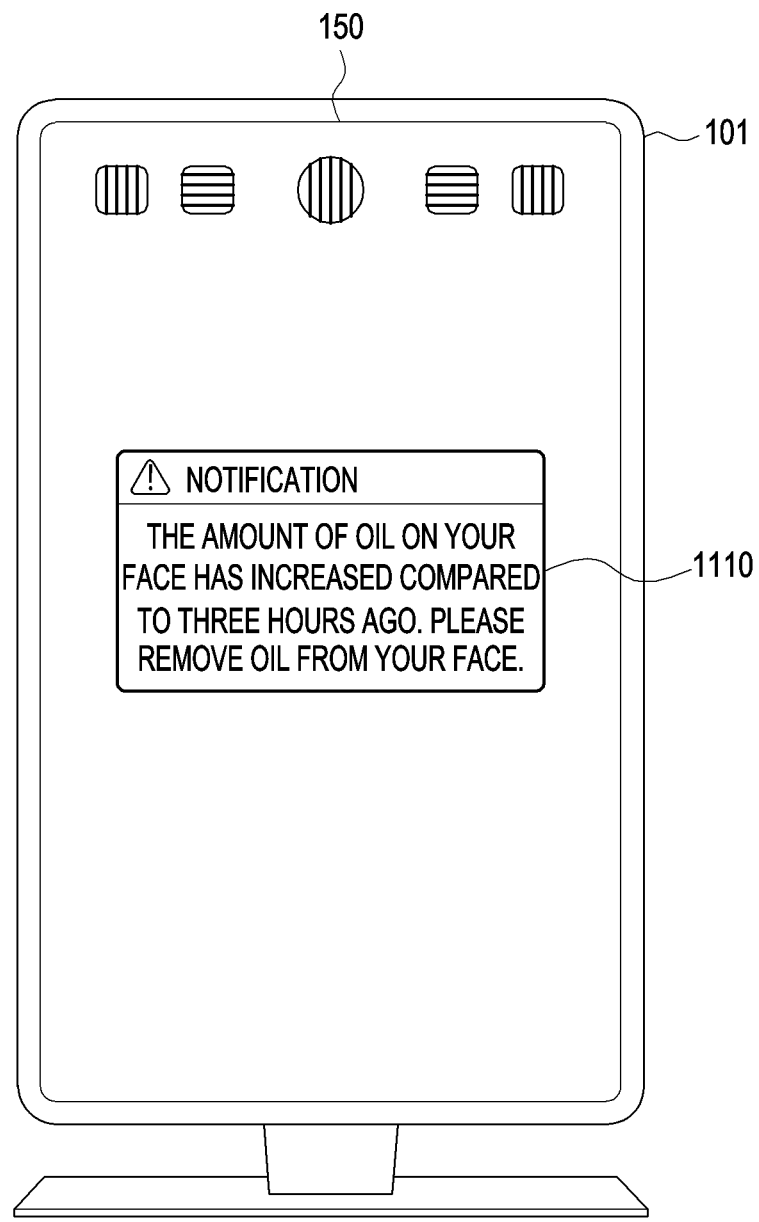
FIG. 11B is a view for describing operation 1030 in FIG. 10.

FIG. 10 is a flowchart illustrating an operation of identifying a user's skin state according to an embodiment. FIG. 11A is a view for describing operation 1020 in FIG. 10, and FIG. 11B is a view for describing operation 1030 in FIG. 10.

Referring to FIG. 10, the electronic device 101 according to an embodiment may obtain multiple images by using multiple amounts of output light in operation 1010. The multiple images may include, for example, a first type image, a second type image, a third type image, a fourth type image (e.g., an image of 75% cross polarization+25% parallel polarization, in other words, an image captured in a state where the output of each of the first light emitting module 130a and the fourth light emitting module 130d is 25%, and the output of each of the second light emitting module 130b and the third light emitting module 130c is 75%) and a fifth type image (e.g., an image of 25% cross polarization+75% parallel polarization, in other words, an image captured in a state where the output of each of the first light emitting module 130a and the fourth light emitting module 130d is 75%, and the output of each of the second light emitting module 130b and the third light emitting module 130c is 25%). However, this is merely an example, and the electronic device 101 may further obtain other types of images (e.g., an image of 60% cross polarization+40% parallel polarization, in other words, an image captured in a state where the output of each of the first light emitting module 130a and the fourth light emitting module 130d is 40%, and the output of each of the second light emitting module 130b and the third light emitting module 130c is 60%), or may not obtain at least one image among the first to fifth type images.

The electronic device 101 according to an embodiment may identify the amount of output light for an image, in which a ratio of a saturation area is initially equal to or larger than a threshold ratio, among the obtained multiple images, in operation 1020. For example, as illustrated in FIG. 11A, the electronic device 101 may identify an image having a saturation area 920, the ratio of which is initially equal to or larger than a threshold ratio (e.g., 0.1%) among the multiple images (e.g., an image of 10% cross polarization+90% parallel polarization, an image of 70% cross polarization+30% parallel polarization, and an image of 50% cross polarization+50% parallel polarization), and may identify the amount of output light of the identified image. The image and/or the amount of output light identified according to operation 1020 may be used as data for comparing a skin state (e.g., the amount of oil) at the current time point with a skin state (e.g., the amount of oil) at a different time point.

The electronic device 101 according to an embodiment may provide information on a skin state (e.g., the amount of oil) by using information on the identified amount of output light in operation 1030. The electronic device 101 may estimate a user's skin state (e.g., the amount of oil) by identifying whether the ratio of the saturation area 920 is equal to or larger than the threshold ratio. For example, the electronic device 101 may estimate that the amount of oil of skin is smaller in a case where "an image of 10% cross polarization+90% parallel polarization" is an image having the saturation area 920, the ratio of which is initially equal to and larger than the threshold ratio, than in a case where "an image of 70% cross polarization+30% parallel polarization" is an image having the saturation area 920, the ratio of which is initially equal to and larger than the threshold ratio. By using the above principle, the electronic device 101 may output, on the display 150, a first guidance message 1110 relating to a skin state, as illustrated in FIG. 11B. For example, the first guidance message 1110 may be output in a case where "an image of 10% cross polarization+90% parallel polarization" is an image having the saturation area 920, the ratio of which is initially equal to and larger than the threshold ratio among images of a measurement performed three hours ago, but "an image of 70% cross polarization+30% parallel polarization" is an image having the saturation area 920, the ratio of which is equal to and larger than the threshold ratio, at the current time point.

Figure 12:
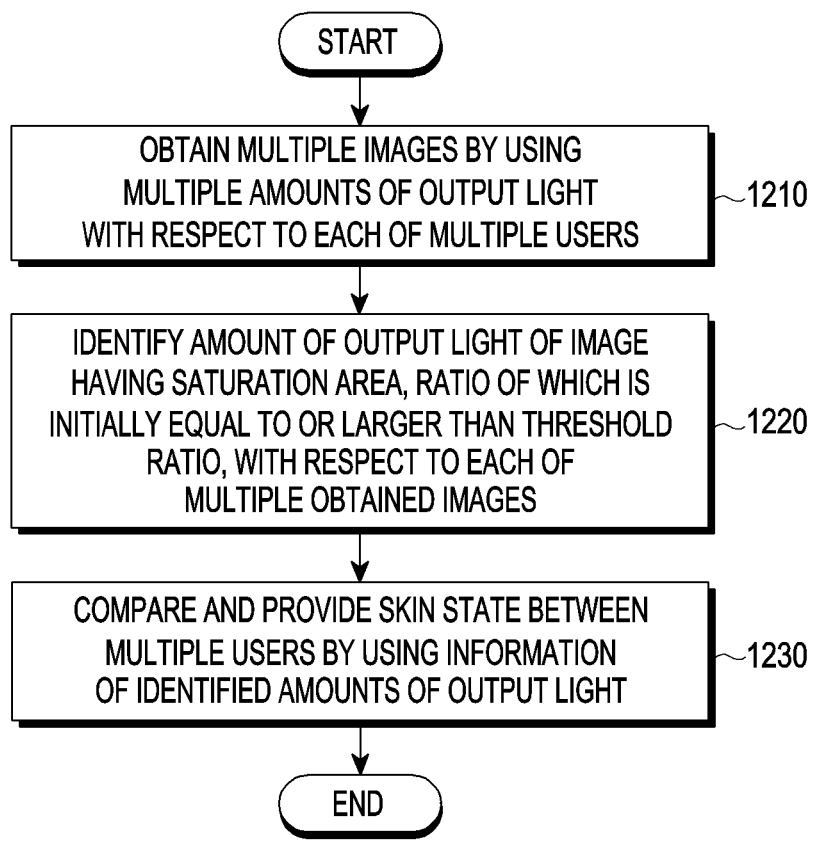
FIG. 12 is a flowchart illustrating an operation of comparing and providing multiple users' skin states, based on a ratio of a saturation area according to an embodiment.
Figure 13A:
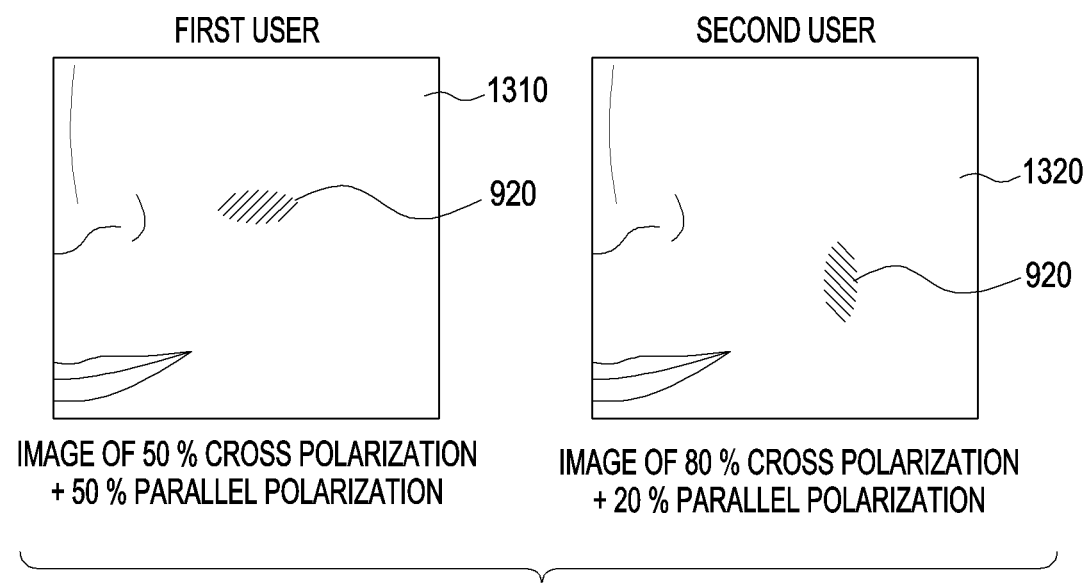
FIG. 13A is a view for describing operation 1220 in FIG. 12.
Figure 13B:
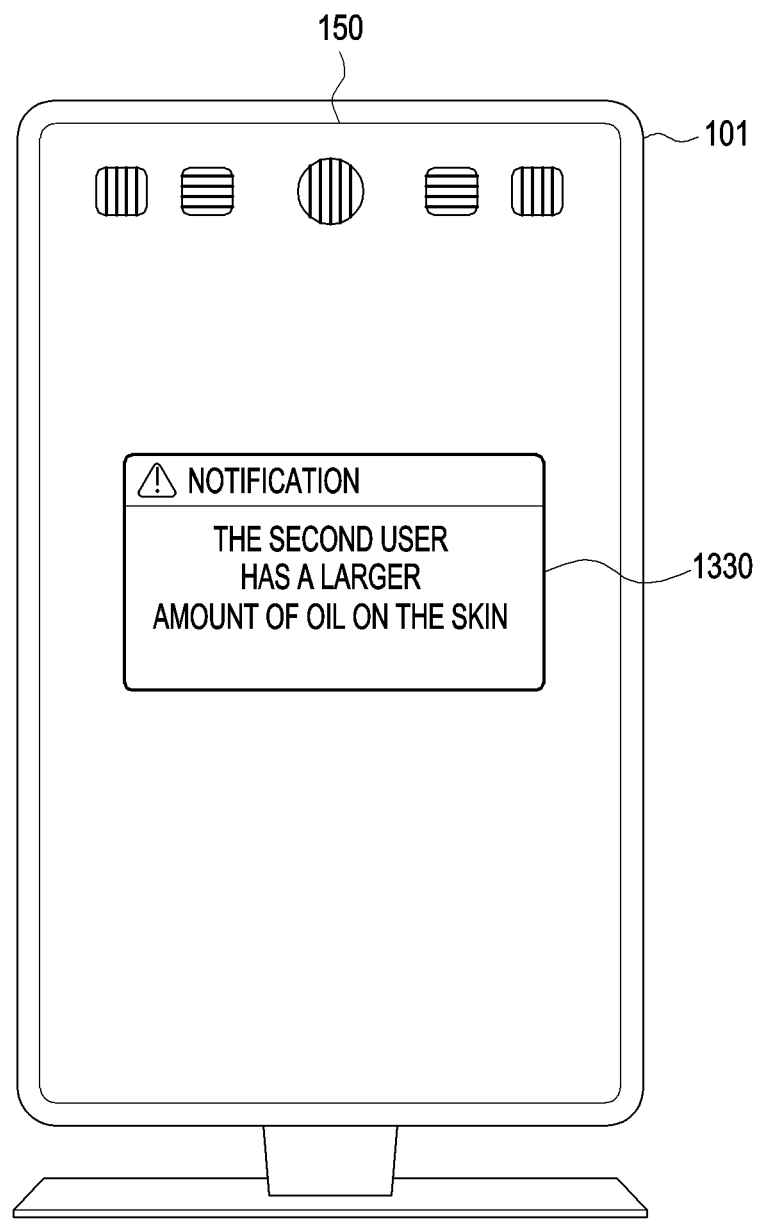
FIG. 13B is a view for describing operation 1230 in FIG. 12.

FIG. 12 is a flowchart illustrating an operation of comparing and providing multiple users' skin states, based on a ratio of a saturation area according to an embodiment. FIG. 13A is a view for describing operation 1220 in FIG. 12, and FIG. 13B is a view for describing operation 1230 in FIG. 12.

Referring to FIG. 12, the electronic device 101 according to an embodiment may obtain multiple images by using multiple amounts of output light with respect to each of multiple users in operation 1210. For example, the electronic device 101 may obtain a first type image to a fifth type image of a first user, and obtain a first type image to a fifth type image of a second user.

The electronic device 101 according to an embodiment may identify the amount of output light of an image having a saturation area 920, the ratio of which is initially equal to or larger than a threshold ratio, with respect to each of the multiple obtained images, in operation 1220. The electronic device 101 may perform operation 1020 described above in FIG. 10 to the multiple images obtained with respect to the first user, and the multiple images obtained with respect to the second user. Referring to FIG. 13A, if, as a result of operation 1020, "an image of 50% cross polarization+50% parallel polarization" is identified as an image having the saturation area 920, the ratio of which is initially equal to and larger than the threshold ratio, with respect to the first user, and "an image of 80% cross polarization+20% parallel polarization" is identified as an image having the saturation area 920, the ratio of which is initially equal to and larger than the threshold ratio, with respect to the second user, the electronic device 101 may determine that the skin of the second user has a larger amount of oil.

The electronic device 101 according to an embodiment may compare and provide a skin state between multiple users by using information on the identified amounts of output light, in operation 1230. The electronic device 101 may display, on the display 150, a second guidance message 1330 (e.g., "the second user has a larger amount of oil on the skin") relating to a skin state, as illustrated in FIG. 13B.

Figure 14A:
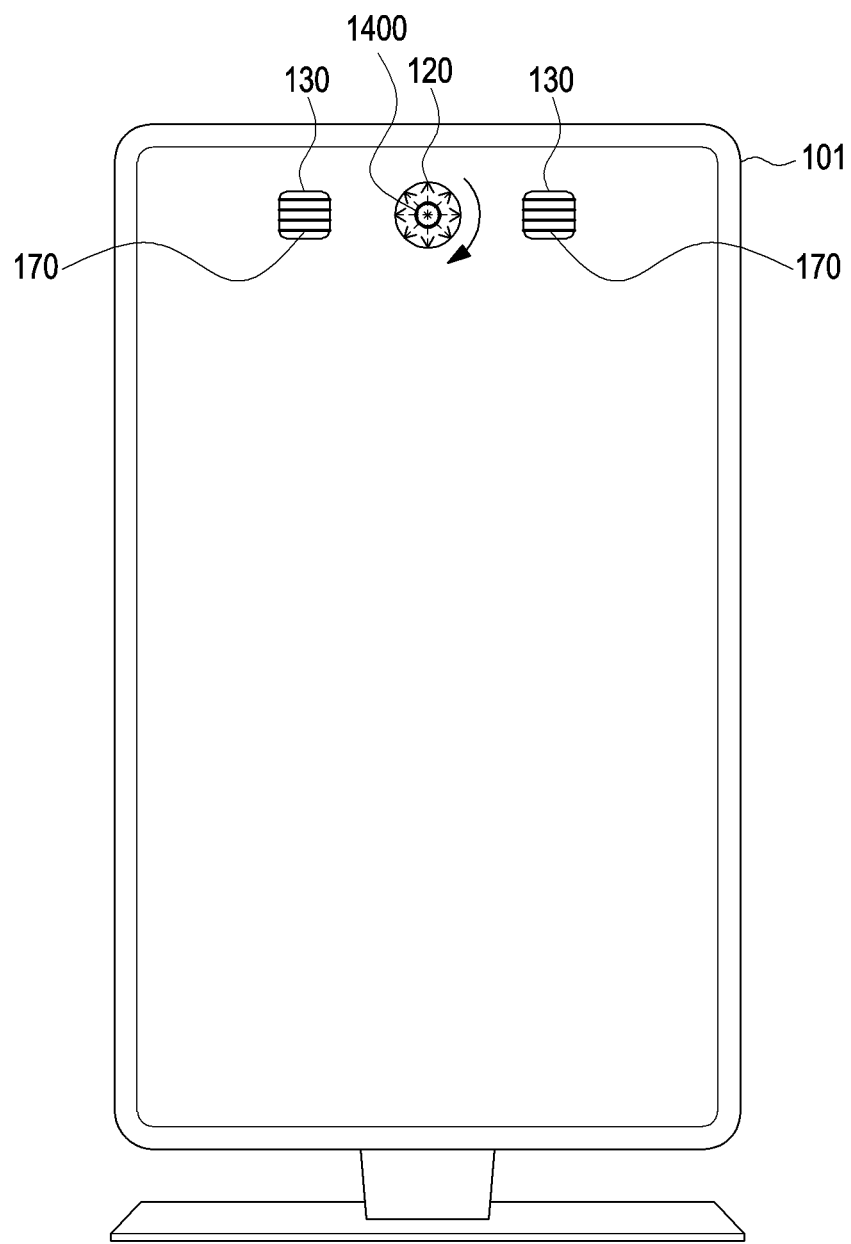
FIGS. 14A and 14B illustrate an electronic device including a polarizing filter according to embodiments.
Figure 14B:
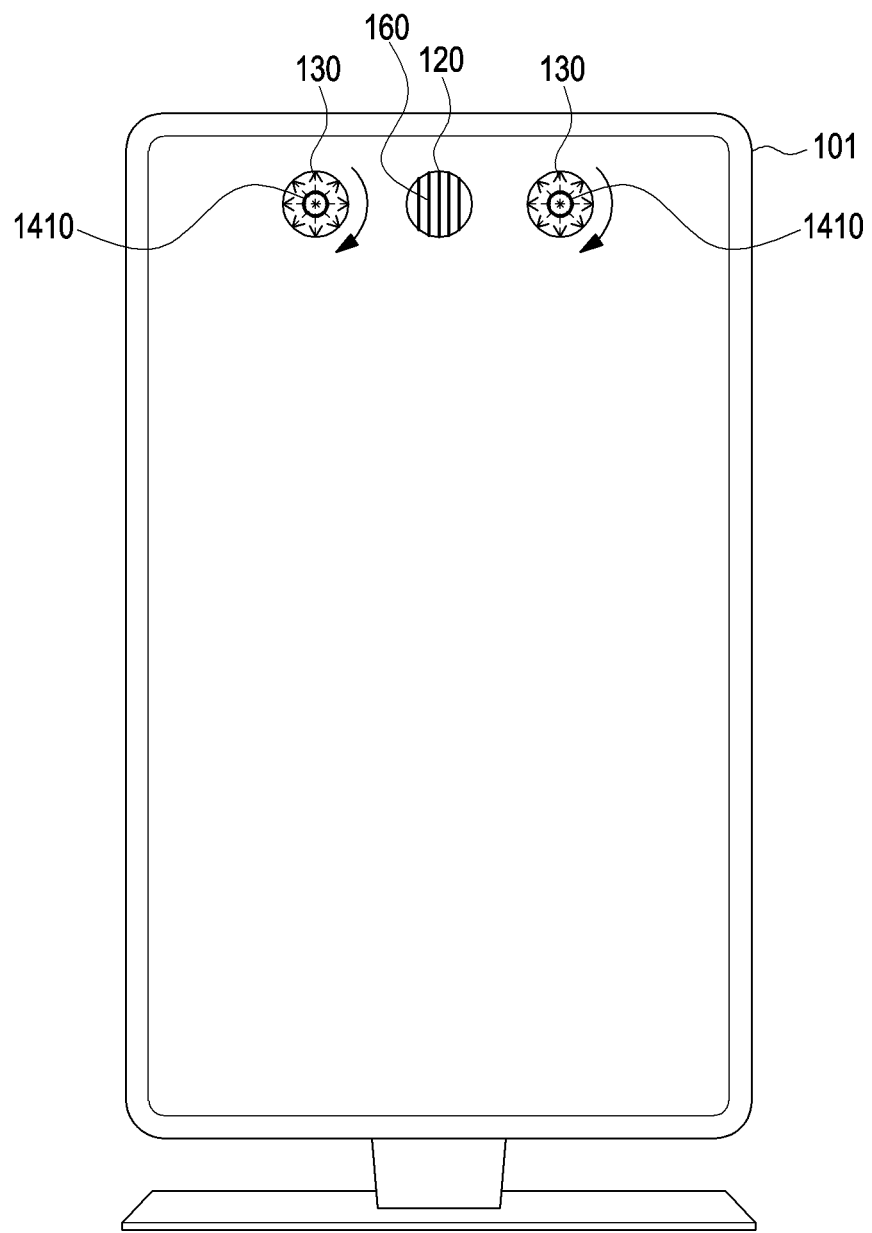

FIGS. 14A and 14B illustrate an electronic device including a polarizing filter according to embodiments. According to various embodiments, as illustrated in FIG. 14A, a first rotating polarizing filter 1400 may be disposed at the camera 120. Alternatively, as illustrated in FIG. 14B, a second rotating polarizing filter 1410 which is rotatable may be disposed at each of light emitting modules. According to an embodiment, the first rotating polarizing filter 1400 and the second rotating polarizing filter 1410 may be manually controlled by a user, or may be automatically controlled by the processor 110 of the electronic device 101. The electronic device 101 may obtain a cross polarization image and/or a parallel polarization image according to the rotation of the rotating polarizing filters described above. According to an embodiment, if the electronic device 101 includes a rotating polarizing filter (e.g., the first rotating polarizing filter 1400 and/or the second rotating polarizing filter 1410), a light source (e.g., the light emitting module 130) may be configured to be of one light source type (e.g., a light emitting module including the first type polarizing filter 160 or a light emitting module including the second type polarizing filter 170).

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 110) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

An embodiment may provide an electronic device capable of providing a function for capturing (or photographing) the user's skin image while changing the amount of output light from lighting, which has a polarizing filter, such that depth information regarding various features of skin (for example, wrinkles and/or pores) may be acquired.

An embodiment may provide an electronic device capable of providing a function for capturing the user's skin image while changing the amount of output light from lighting, which has a polarizing filter, such that the user's skin condition may be analyzed (for example, the relative amount of oil on the skin may be measured).

At least one of the components, elements, modules or units described herein may be embodied as various numbers of hardware, software and/or firmware structures that execute respective functions described above, according to an embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above embodiments may be implemented in algorithms that execute on one or more processors. Furthermore, the components, elements or units represented by a block or processing operations may employ any number of related art techniques for electronics configuration, signal processing and/or control, data processing and the like.

While embodiments of the disclosure have been particularly shown and described, it will be understood by one of ordinary skill in the art that variations in form and detail may be made therein without departing from the spirit and scope of the attached claims.

What is claimed is:

1. An electronic device comprising:
   a display;
   a camera;
   a first light emitting module, wherein each of the camera and the first light emitting module comprises a first type polarizing filter;
   a second light emitting module comprising a second type polarizing filter that is different from the first type polarizing filter; and
   at least one processor configured to:
   obtain a plurality of images of a skin by using the camera, based on different ratios between an amount of a first light output from the first light emitting module and an amount of a second light output from the second light emitting module;
   identify a ratio between the amount of the first light and the amount of the second light, at which a corresponding first image has a ratio of a saturation area that is equal to or greater than a threshold ratio, among the plurality of images;
   control the display to display the first image and to display information on a state of the skin based on the identified ratio between the amount of the first light and the amount of the second light.

2. The electronic device of claim 1, wherein the at least one processor is further configured to obtain a second image by using the camera, based on the first light only.

3. The electronic device of claim 2, wherein the at least one processor is further configured to obtain a third image by using the camera, based on the second light only.

4. The electronic device of claim 3, wherein the at least one processor is further configured to generate a depth map of at least one feature point by using the first image, the second image, and the third image.

5. The electronic device of claim 1, wherein the first type polarizing filter is configured to remove a substantially horizontally vibrating component from the first light.

6. The electronic device of claim 1, wherein the second type polarizing filter is configured to remove a substantially vertically vibrating component from the second light.

7. The electronic device of claim 1, wherein the at least one processor is further configured to:
   identify whether a target area is in a saturation state; and
   based on the target area not being in the saturation state, control the camera to capture the first image including the target area.

8. The electronic device of claim 1, wherein the at least one processor is further configured to control the first light emitting module and the second light emitting module such that the amount of the first light and the amount of the second light have a particular ratio.

9. The electronic device of claim 1, wherein at least one of the first type polarizing filter and the second type polarizing filter is rotatable.

10. A method for controlling an electronic device, the method comprising:
    obtaining a plurality of images of a skin by using a camera of the electronic device, based on different ratios between an amount of a first light output from a first light emitting module and an amount of a second light output from a second light emitting module;
    identifying a ratio between the amount of the first light and the amount of the second light, at which a corresponding first image has a ratio of a saturation area that is equal to or greater than a threshold ratio, among the plurality of images; and
    providing the first image and to display information on a state of the skin based on the identified ratio between the amount of the first light and the amount of the second light,
    wherein each of the camera and the first light emitting module comprises a first type polarizing filter, and
    wherein the second light emitting module comprises a second type polarizing filter that is different from the first type polarizing filter.

11. The method of claim 10, further comprising obtaining a second image by using the camera based on the first light only.

12. The method of claim 11, further comprising obtaining a third image by using the camera based on the second light only.

13. The method of claim 12, further comprising generating a depth map of at least one feature point by using the first image, the second image, and the third image.

14. The method of claim 10, wherein the first type polarizing filter is configured to remove a substantially horizontally vibrating component from the first light.

15. The method of claim 10, wherein the second type polarizing filter is configured to remove a substantially vertically vibrating component from the second light.

16. The method of claim 10, further comprising:
identifying whether a target area is in a saturation state; and
based on the target area not being in the saturation state, controlling the camera to capture the first image including the target area.

17. The method of claim 10, further comprising controlling the first light emitting module and the second light emitting module such that the amount of the first light and the amount the second light have a particular ratio.

18. The method of claim 10, wherein at least one of the first type polarizing filter and the second type polarizing filter is rotatable.

* * * * *